United States Patent
Shouji

(10) Patent No.: US 9,178,463 B2
(45) Date of Patent: Nov. 3, 2015

(54) INVERTER CONTROL DEVICE AND INVERTER CONTROL METHOD

(75) Inventor: Mitsuhiro Shouji, Yamato (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 11 days.

(21) Appl. No.: 14/130,782

(22) PCT Filed: Jul. 4, 2012

(86) PCT No.: PCT/JP2012/067054
§ 371 (c)(1),
(2), (4) Date: Jan. 3, 2014

(87) PCT Pub. No.: WO2013/005762
PCT Pub. Date: Jan. 10, 2013

(65) Prior Publication Data
US 2014/0145665 A1    May 29, 2014

(30) Foreign Application Priority Data

Jul. 4, 2011 (JP) ................................. 2011-148237

(51) Int. Cl.
| | |
|---|---|
| H02P 27/06 | (2006.01) |
| B60L 15/02 | (2006.01) |
| H02P 6/14 | (2006.01) |
| H02P 21/00 | (2006.01) |

(52) U.S. Cl.
CPC ............... *H02P 27/06* (2013.01); *B60L 15/025* (2013.01); *H02P 6/145* (2013.01); *H02P 21/0035* (2013.01); *Y02T 10/643* (2013.01)

(58) Field of Classification Search
CPC ...................................................... H02P 27/06
USPC ............................ 318/503, 494, 400.02, 700
See application file for complete search history.

(56) References Cited

U.S. PATENT DOCUMENTS

| | | | | |
|---|---|---|---|---|
| 5,903,128 | A * | 5/1999 | Sakakibara et al. | 318/721 |
| 6,462,492 | B1 * | 10/2002 | Sakamoto et al. | 318/400.32 |
| 6,972,534 | B1 | 12/2005 | Schulz et al. | |
| 8,106,619 | B2 * | 1/2012 | Tobari et al. | H02P 6/18 318/400.01 |
| 2008/0201041 | A1 * | 8/2008 | Jiang | 701/42 |
| 2010/0320948 | A1 | 12/2010 | Royak et al. | |

FOREIGN PATENT DOCUMENTS

| | | |
|---|---|---|
| EP | 1708355 A1 | 10/2006 |
| JP | 06335277 A | 12/1994 |
| JP | 2008189225 A | 8/2008 |
| JP | 2011030349 A | 2/2011 |

* cited by examiner

*Primary Examiner* — David S Luo
(74) *Attorney, Agent, or Firm* — Young Basile

(57) ABSTRACT

An inverter control device is equipped with an inverter and a command value calculation unit calculates command values for the alternating current voltage output from the inverter. A phase compensation unit compensates the phase of the command values or the phase of the detected values. An inverter control unit controls the inverter on the basis of the command values or detected values that have been compensated by the phase compensation unit. A motor rotational velocity detector detects the rotational velocity of a motor. The phase compensation unit calculates the phase lead amount on the basis of a phase compensation time that is set for the purpose of obtaining a prescribed phase margin and on the basis of the rotational velocity and, in accordance with the phase lead amount, compensates the phase that is based on the specific characteristics of the motor.

7 Claims, 17 Drawing Sheets

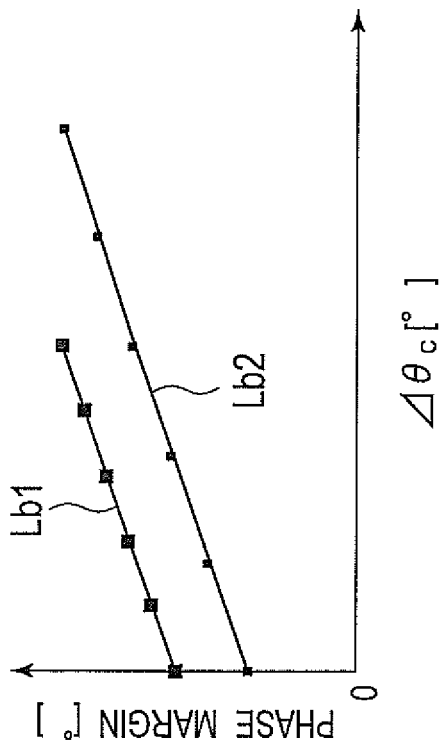
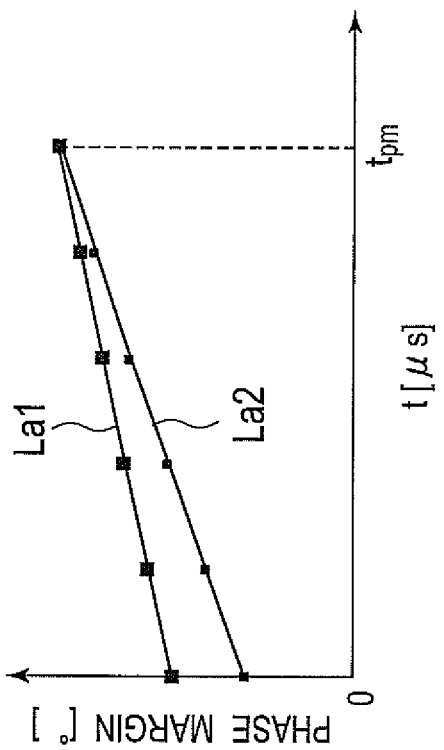
FIG. 4B
FIG. 4A

INVERTER CONTROL DEVICE AND INVERTER CONTROL METHOD

CROSS REFERENCE TO RELATED APPLICATION

The present application claims priority to Japanese Patent Application No. 2011-148237, filed Jul. 4, 2011 and incorporated herein in its entirety.

TECHNICAL FIELD

The present invention relates to an inverter control device and an inverter control method.

BACKGROUND

A control device for an electric motor is known (see Japanese Patent Application Publication No. 06-335277), which includes an electric power converter configured to supply AC power to an AC motor and a rotating coordinate transformation unit configured to transform a two-phase rotating axis into a three-phase axis for the purpose of controlling the electric power converter. A rotating angle of at least the AC motor detected at every predetermined sampling time is used as a coordinate transformation angle. The control device disclosed in Japanese Patent Application Publication No. 06-335277 includes a first rotating angle compensation unit configured to sum up the rotating angle of at least the AC motor detected at every predetermined sampling time and a rotating angle at a time delayed from the sampling time. Hence, the summed rotating angle is set as the coordinate transformation angle.

However, the control device disclosed in Japanese Patent Application Publication No. 06-335277 does not deal with a reduction in phase margin attributed to an inherent characteristic of a motor, and has a problem of having an unstable control system.

SUMMARY

An object of the present invention is to provide a control device and a control method for an inverter, which stabilize a control system.

To attain the object, a control device and a control method for an inverter according to an aspect of the present invention are configured to calculate a phase lead amount on the basis of phase compensation time and a rotational velocity of a motor, and to cause a phase that is based on an inherent characteristic of the motor to lead in accordance with the phase lead amount.

BRIEF DESCRIPTION OF DRAWINGS

The description herein makes reference to the accompanying drawings wherein like reference numerals refer to like parts throughout the several views, and wherein:

FIG. 4A is a graph showing a characteristic of a phase margin relative to phase compensation time ($t_{pm}$) observed in the inverter control device of FIG. 1;

FIG. 4B is a graph showing a characteristic of the phase margin relative to a phase lead amount ($\Delta\theta c$) observed in the inverter control device of FIG. 1;

DESCRIPTION OF EMBODIMENTS

Embodiments of the present invention will be described below on the basis of to the drawings.

First Embodiment

Figure 1:
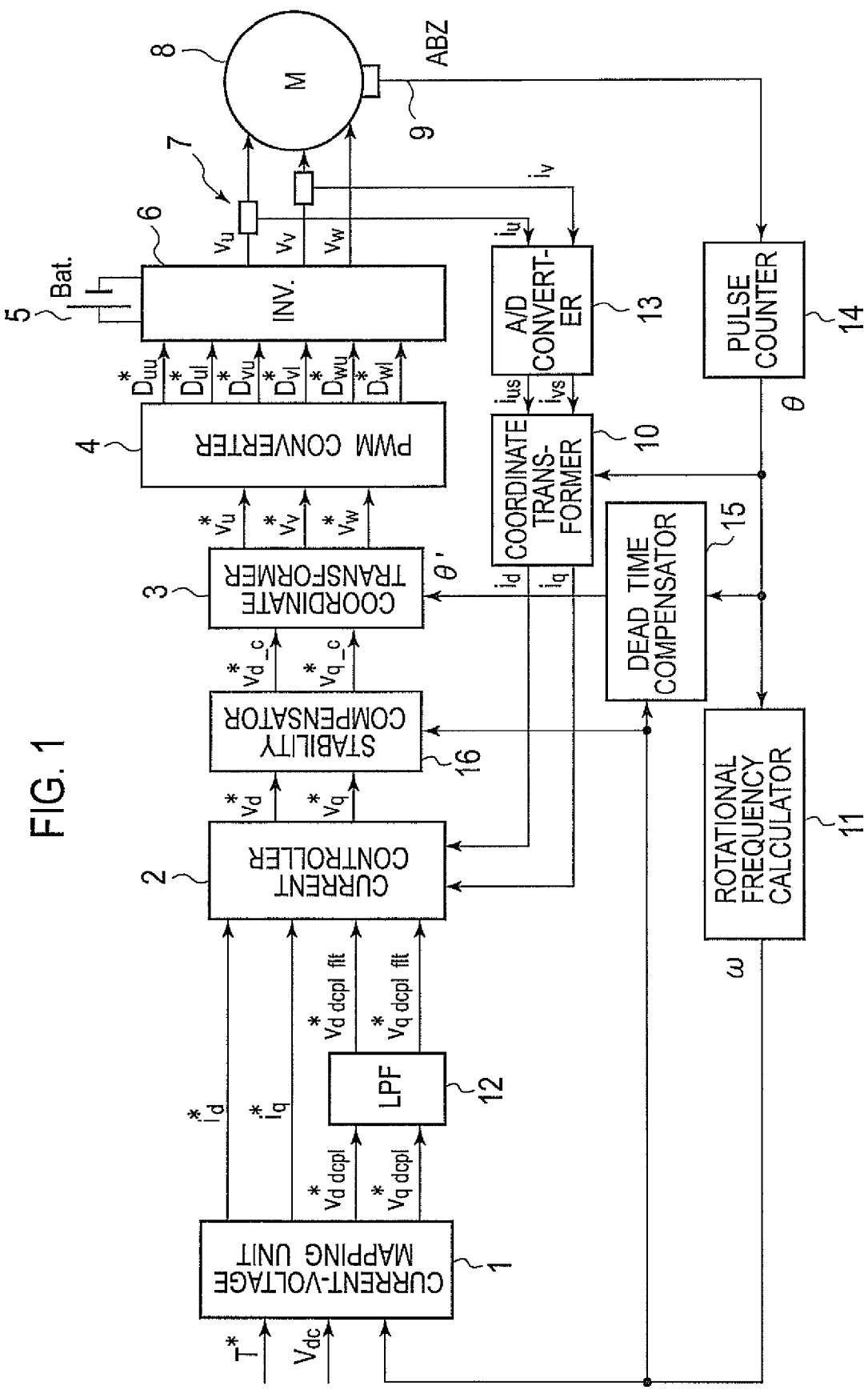
FIG. 1 is a block diagram of an inverter control device according to an embodiment of the present invention.

An inverter control device according to an embodiment of the invention will be described with reference to FIG. 1. Although a detailed illustration is omitted therein, when the inverter control device of the embodiment is installed in an electric vehicle, a permanent magnet motor 8 adapted to three-phase AC power is joined to an axle of the electric vehicle and is configured to operate as a driving source. Note that the inverter control device of the embodiment is also applicable to a vehicle other than the electric vehicle, such as a hybrid electric vehicle (HEV).

The inverter control device of the embodiment is a control device configured to control an operation of the motor 8, and includes a current-voltage mapping unit 1, a current controller 2, a coordinate transformer 3, a PWM (pulse width modulation) converter 4, a battery 5, an inverter 6, current sensors 7, a magnetic pole position detector 9, a coordinate transformer 10, a rotational frequency calculator 11, an LPF (low-pass filter) 12, an A/D converter 13, a pulse counter 14, a dead time compensator 15, and a stability compensator 16.

A torque command value (T*), an angular frequency ($\omega$), and a voltage ($V_{dc}$), are inputted to the current-voltage mapping unit 1. The torque command value (T*) is inputted from outside as an output target value for the motor 8. The angular frequency ($\omega$) is a rotational velocity of the motor 8 and an output from the rotational frequency calculator 11. The voltage ($V_{dc}$) is a detection voltage of the battery 5. The current-voltage mapping unit 1 stores a map for outputting d- and q-axis current command values ($i^*_d$, $i^*_q$) and d- and q-axis non-interference voltage command values ($V^*_{d\_dcpl}$, $V^*_{q\_dcpl}$) by using the torque command value ($T^*$), the angular frequency ($\omega$), and the voltage ($V_{dc}$) as indices. By referring to the map, the current-voltage mapping unit 1 calculates and outputs the d- and q-axis current command values ($i^*_d$, $i^*_q$) and the d- and q-axis non-interference voltage command values ($V^*_{d\_dcpl}$, $V^*_{q\_dcpl}$) corresponding to the torque command value ($T^*$), angular frequency ($\omega$), and voltage ($V_{dc}$) which are inputted. Here, d- and q-axes indicate components of a rotating coordinate system.

Regarding the d- and q-axis non-interference voltage command values ($V^*_{d\_dcpl}$, $V^*_{q\_dcpl}$), since an interference voltage $\omega L_d i_d$ is generated on the d-axis and an interference voltage $\omega L_q i_q$ is generated on the q-axis when currents flow on the d-axis and the q-axis, the d- and q-axis non-interference voltage command values ($V^*_{d\_dcpl}$, $V^*_{q\_dcpl}$) are provided as the voltages for cancelling the interference voltages. Here, $L_d$ denotes inductance on the d-axis while $L_q$ denotes inductance on the q-axis. The d- and q-axis current command values ($i^*_d$, $i^*_q$) and the d- and q-axis non-interference voltage command values ($V^*_{d\_dcpl}$, $V^*_{q\_dcpl}$) correspond to command values for an alternating current to be outputted from the inverter 6 to the motor 8. Pulse widths of switching elements are determined on the basis of the command values, and output power of the inverter 6 is thus determined.

The LPF 12 cuts off a high-frequency band by using the d- and q-axis non-interference voltage command values ($V^*_{d\_dcpl}$, $V^*_{q\_dcpl}$) as input values, and outputs post-filtering voltage command values ($V^*_{d\_dcpl\_flt}$, $V^*_{q\_dcpl\_flt}$).

The current controller 2 performs control calculation by using the d- and q-axis current command values ($i^*_d$, $i^*_q$), the post-filtering voltage command values ($V^*_{d\_dcpl\_flt}$, $V^*_{q\_dcpl\_flt}$), and d- and q-axis currents ($i_d$, $i_q$) as input values, thereby outputting d- and q-axis voltage command values ($V^*_d$, $V^*_q$) to the stability compensator 16.

The stability compensator 16 corrects the voltage command values ($V^*_d$, $V^*_q$) on the basis of the angular frequency ($\omega$), and outputs post-correction d- and q-axis voltage command values ($V^*_{d\_c}$, $V^*_{q\_c}$) to the coordinate transformer 3. The stability compensator 16 will be described later in detail.

The post-correction d- and q-axis voltage command values ($V^*_{d\_c}$, $V^*_{q\_c}$) and a phase amount ($\theta'$), which is outputted from the dead time compensator 15, are inputted to the coordinate transformer 3. The coordinate transformer 3 transforms the post-correction d- and q-axis voltage command values ($V^*_{d\_c}$, $V^*_{q\_c}$) of the rotating coordinate system into U-, V- and W-phase voltage command values ($V^*_u$, $V^*_v$, $V^*_w$) of a fixed coordinate system (U-, V- and W-phases) by applying the following formula 1.

[Formula 1]

$$\begin{bmatrix} v^*_u \\ v^*_v \\ v^*_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta' & -\sin\theta' \\ \sin\theta' & \cos\theta' \end{bmatrix} \begin{bmatrix} v^*_{d\_c} \\ v^*_{q\_c} \end{bmatrix} \quad (1)$$

The PWM converter 4 generates drive signals ($D^*_{uu}$, $D^*_{ul}$, $D^*_{vu}$, $D^*_{vl}$, $D^*_{wu}$, $D^*_{wl}$) for the switching elements of the inverter 6 on the basis of the inputted U-, V- and W-phase voltage command values ($V^*_u$, $V^*_v$, $V^*_w$), and outputs the drive signals to the inverter 6. The switching elements switch on and off on the basis of PWM pulse signals.

The battery 5 is a DC power supply including secondary cells, which serves as a power source of the vehicle of the embodiment. The inverter 6 includes a three-phase inverter circuit formed by connecting multiple circuits, each of which has a pair of switching elements (not shown) such as MOSFETs and IGBTs. The drive signals ($D^*_{uu}$, $D^*_{ul}$, $D^*_{vu}$, $D^*_{vl}$, $D^*_{wu}$, $D^*_{wl}$) are respectively inputted to the switching elements. Then, a DC voltage from the DC power supply is converted into AC voltages ($V_u$, $V_v$, $V_w$) by switching operations of the switching elements. The AC voltages ($V_u$, $V_v$, $V_w$) are then inputted to the motor 8. On the other hand, when the motor 8 operates as an alternator, the inverter 6 converts an AC voltage outputted from the motor 8 into a DC voltage, and outputs the DC voltage to the battery 5. Thus, the battery 5 is charged.

The current sensors 7 are provided for the U phase and the V phase, respectively, and are configured to detect phase currents ($i_u$, $i_v$) of the U phase and the V phase, and to output the phase currents ($i_u$, $i_v$) to the A/D converter 13. The A/D converter 13 samples the phase currents ($i_u$, $i_v$), and outputs sampled phase currents ($i_{us}$, $i_{vs}$) of the U phase and the V phase to the coordinate transformer 10. A current of the W phase is not detected by any of the current sensors 7. Instead, the coordinate transformer 10 calculates a phase current ($i_{ws}$) of the W phase by applying the following formula 2 and on the basis of the inputted phase currents ($i_{us}$, $i_{vs}$) of the U phase and the V phase.

[Formula 2]

$$i_{ws} = -i_{us} - i_{vs} \quad (2)$$

Here, regarding the phase current of the W phase, it is also possible to provide a current sensor 7 for the W phase and to detect the phase current with the current sensor 7.

The motor 8 is a multiphase motor which is connected to the inverter 6. The motor 8 also operates as the alternator. The magnetic pole position detector 9 is a detector provided to the motor 8 and configured to detect magnetic pole positions of the motor 8. The magnetic pole position detector 9 outputs pulses of an A phase, a B phase, and a Z phase, which correspond to the positions of the magnetic poles, to the pulse counter 14. The pulse counter 14 counts the pulses outputted from the magnetic pole position detector 9, thus obtains a detection value ($\theta$) representing positional information on a rotor of the motor 8, and outputs the detection value ($\theta$) to the rotational frequency calculator 11. The rotational frequency calculator 11 calculates the angular frequency ($\omega$) of the motor 8 from the detection value ($\theta$) by the pulse counter 14.

The coordinate transformer 10 is a control unit configured to perform phase transformation from the three phases to the two phases. The phase currents ($i_{us}$, $i_{vs}$, $i_{ws}$) and the detection value ($\theta$) by the pulse counter 14 are inputted to the coordinate transformer 10. The coordinate transformer 10 transforms the phase currents ($i_{us}$, $i_{vs}$, $i_{ws}$) of the fixed coordinate system into the d- and q-axis currents ($i_d$, $i_q$) of the rotating coordinate system by applying the following formula 3.

[Formula 3]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{us} \\ i_{vs} \\ i_{ws} \end{bmatrix} \quad (3)$$

Hence, the inverter control device of the embodiment performs control in accordance with a current control loop upon input of the d- and q-axis currents ($i_d$, $i_q$) to the current controller 2.

The dead time compensator 15 compensates for a delay in voltage output from a point of determination of the U-, V- and W-phase voltage command values ($V^*_u$, $V^*_v$, $V^*_w$) to a point of application of the AC voltages ($V_u$, $V_v$, $V_w$) to the motor 8, a delay attributed to dead time caused by zero-order hold sampling by the current sensor 7 and the A/D converter 13, and a delay caused by a noise-cut filter. The dead time compensator 15 receives the detection value (θ) as well as the angular frequency (ω) as inputted values, and outputs the phase amount (θ') to the coordinate transformer 3.

Figure 2:
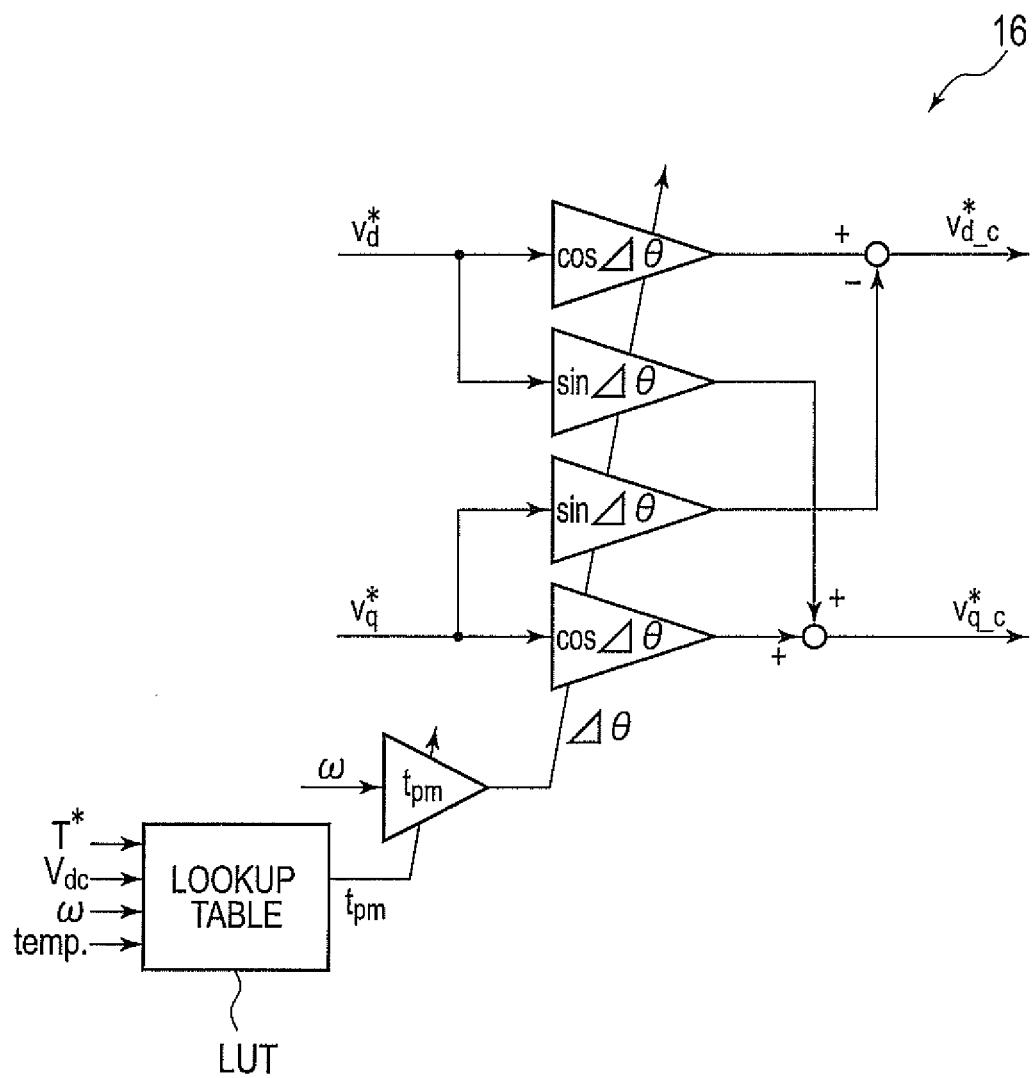
FIG. 2 is a block diagram of a stability compensator of FIG. 1.

Next, a detailed configuration of the stability compensator 16 will be described by using FIG. 2. The stability compensator 16 calculates the post-correction d- and q-axis voltage command values ($V^*_{d\_c}$, $V^*_{q\_c}$) from the d- and q-axis voltage command values ($V^*_d$, $V^*_q$) by using the rotating coordinate transformation in the rectangular coordinates. Specifically, the post-correction d-axis voltage command value ($V^*_{d\_c}$) is calculated by subtracting a product of the q-axis voltage command value ($V^*_q$) and sin(Δθ) from a product of the d-axis voltage command value ($V^*_d$) and cos(Δθ). Meanwhile, the post-correction q-axis voltage command value ($V^*_{q\_c}$) is calculated by adding a product of the d-axis voltage command value ($V^*_d$) and sin(Δθ) to a product of the q-axis voltage command value ($V^*_q$) and cos(Δθ).

A phase lead amount (Δθ) of rotation attributed to the rotating coordinate transformation by the stability compensator 16 is calculated by phase compensation time ($t_{pm}$) and the angular frequency (ω). The phase compensation time ($t_{pm}$) is a value determined on the basis of an inherent characteristic of the motor 8, which is a preset value. In the embodiment, the stability compensator 16 includes a lookup table LUT which associates the torque command value (T*) inputted from the outside, the detection voltage ($V_{dc}$) of the battery 5, the angular frequency (ω) of the motor 8, and a motor temperature (temp.) with the phase compensation time ($t_{pm}$). Then, the stability compensator 16 calculates the phase compensation time ($t_{pm}$) by referring to the lookup table LUT while using the torque command value (T*) inputted from the outside, the detection voltage ($V_{dc}$) of the battery 5, the angular frequency (ω) of the motor 8, and the motor temperature (temp.) as input values. Further, the phase lead amount (Δθ) is calculated by obtaining a product of the angular frequency (ω) and the phase compensation time ($t_{pm}$) that is an output value from the lookup table LUT.

Thus, the d- and q-axis voltage command values are corrected with the phase lead amount (Δθ) in such a manner as to cause the phases to lead in a rotational direction of the motor 8 without changing a magnitude of a voltage command value vector composed of the d-axis voltage command value ($V^*_d$) and the q-axis voltage command value ($V^*_q$). The d-axis voltage command value ($V^*_d$) is a voltage command value in a direction of the magnetic pole. The q-axis voltage command value ($V^*_q$) is a voltage instruction value in an orthogonal direction to the magnetic pole.

Figures 3A, 3B:
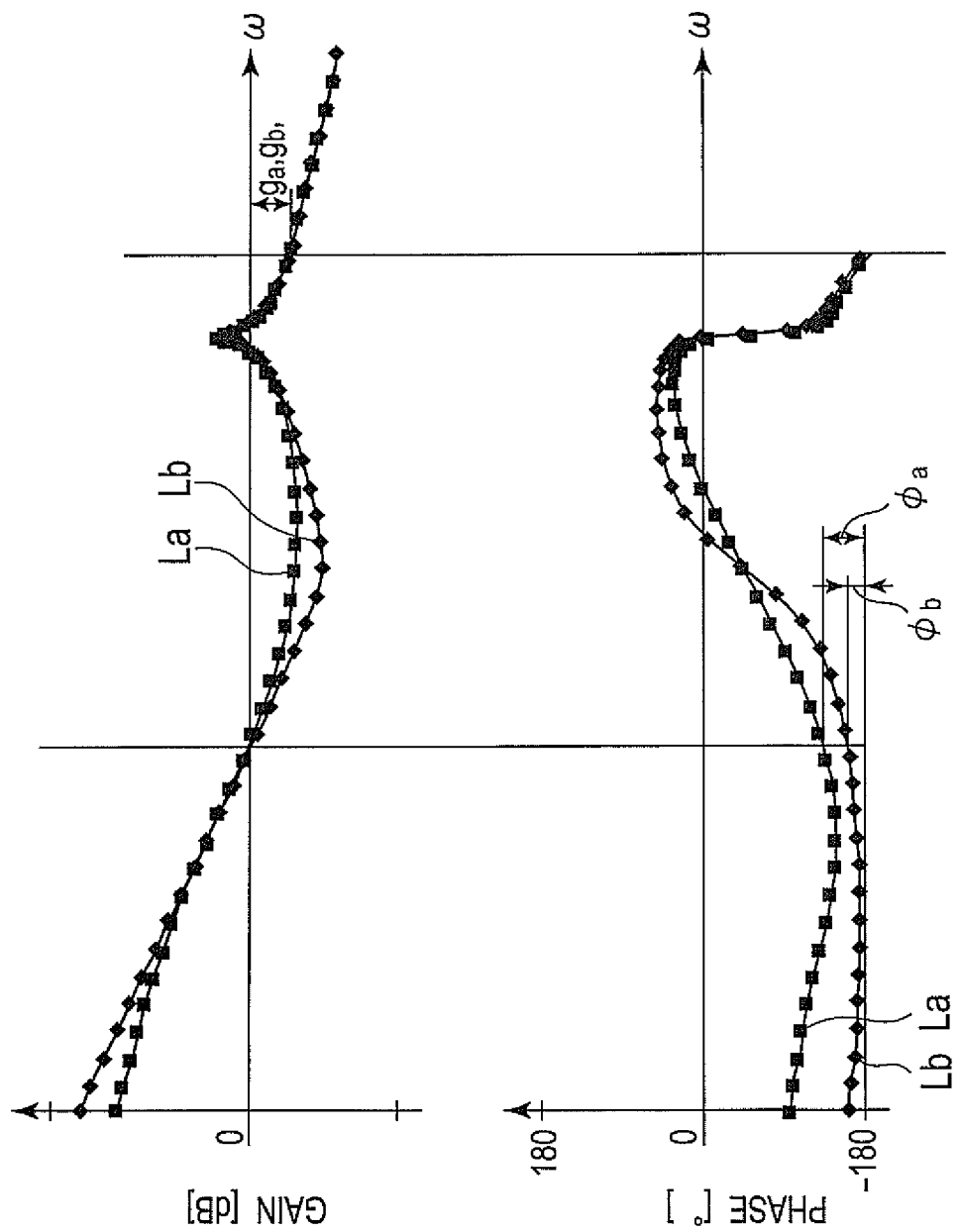
FIG. 3A is a graph showing a gain characteristic of the inverter control device of FIG. 1 as well as a gain characteristic of a comparative example.
FIG. 3B is a graph showing a phase characteristic of the inverter control device of FIG. 1 as well as a phase characteristic of the comparative example.

Here, relations between the phase compensation time ($t_{pm}$) and a phase margin as well as a gain margin in a control system of the inverter control device of the embodiment will be described by using FIGS. 3A and 3B. FIGS. 3A and 3B show Bode diagrams of loop transfer characteristics in a current control system of the inverter control device, in which FIG. 3A shows gain characteristics with respect to the angular frequency while FIG. 3B shows phase characteristics with respect to the angular frequency. In each of FIG. 3A and FIG. 3B, a graph La shows a characteristic of the present invention while a graph Lb shows a characteristic of a comparative example in which the phase compensation time ($t_{pm}$) is set.

The phase margin is a difference between a phase at a frequency (gain crossover) where a gain curve falls below 0 (dB) and −180°. The gain margin is a difference between a gain at a frequency (phase crossover) where a phase curve falls below −180° and 0 (dB). As shown in FIG. 3A, the gain margin of the embodiment is denoted by $g_a$ and the gain margin of the comparative example is denoted by $g_b$. As shown in FIG. 3B, the phase margin of the embodiment is denoted by $\phi_a$ and the phase margin of the comparative example is denoted by $\phi_b$.

As shown in FIG. 3B, the control system is unstable in the comparative example because the phase margin ($\phi_b$) is insufficient. On the other hand, the control system is stable in the embodiment because the sufficient phase margin ($\phi_a$) is obtained. Meanwhile, as shown in FIG. 3A, values of the gain margins ($g_a$, $g_b$) of the embodiment and the comparative example are almost equal. As shown in the graph of the comparative example, the reduction in phase margin occurs in a low-frequency region. The method of correction to deal with the reduction in phase margin by forecasting a position that a rotor will reach upon a lapse of time equivalent to dead time as disclosed in Patent Literature 1 cannot suppress the reduction in phase margin in the low-frequency range. In the embodiment, it was confirmed that the reduction in phase margin in the low-frequency range was caused by the inherent characteristic of the motor 8. For this reason, the embodiment sets a compensation coefficient based on the characteristic of the motor 8 as the phase compensation time ($t_{pm}$) and the phases of the d- and q-axis current command values are compensated for on the basis of the phase compensation time ($t_{pm}$). Thus, the embodiment can suppress the reduction in phase margin in the low-frequency range while suppressing reduction in gain margin in a high-frequency region.

Next, the configuration of the embodiment to obtain the product of the phase compensation time ($t_{pm}$), which is a time-unit parameter, and the angular frequency (ω) at the time of calculation of the phase lead amount (Δθ) will be described with reference to FIG. 4A and FIG. 4B. A graph La1 and a graph Lb1 show characteristics of an angular frequency ($\omega_1$) while a graph La2 and a graph Lb2 show characteristics of an angular frequency ($\omega_2$) which is higher than the angular frequency ($\omega_1$). The graph La1 and the graph La2 in FIG. 4A show characteristics of phase margins obtained by: setting phase compensation time (t) as in the case of the present invention; and defining the product of the phase compensation time (t) and the angular frequency (ω) of the motor 8 as the phase lead amount (Δθ). Here, the phase compensation time (t) is used as a parameter. On the other hand, the graph Lb1 and the graph Lb2 in FIG. 4B show characteristics of phase margins obtained by using a phase lead amount (Δθc) itself as a parameter. Accordingly, the phase lead amount (Δθc) does not contain a factor of the detected angular frequency (ω) of the motor 8. FIG. 4B is therefore presented as a comparative example.

As shown in FIG. 4B, when the phase lead amount ($\Delta\theta c$) is used as the parameter, the phase margins take on different values when the angular frequencies are different. On the other hand, as shown in FIG. 4A, when the phase compensation time (t) is used as the parameter, the phase margins take on substantially the same values even when the angular frequencies are different by means of setting the phase compensation time (t) equal to $t_{pm}$. Thus, the embodiment can maintain the high phase margin stably with respect to the number of revolutions of the motor 8 by: setting the phase compensation time ($t_{pm}$) being a time unit, as the parameter for determining the stability of the control system; and obtaining the phase lead amount ($\Delta\theta$) by use of the product of the phase compensation time ($t_{pm}$) and the angular frequency ($\omega$).

Now, relations between the characteristic of the motor 8 and the phase compensation time ($t_{pm}$) will be described. A motor provided with a general current control system has a characteristic in that a phase delay in comparison with that in the low frequency region becomes larger with an increase in the number of revolutions. Hence, there is a risk of a reduction in phase margin that may lead to an unstable state.

In the meantime, as shown in FIG. 4B, an inclination formed between a compensation amount (the phase lead amount) and the phase margin remains almost the same irrespective of the number of revolutions. Nevertheless, an absolute value of the phase margin is offset. In other words, because the motor inherently has a sufficient phase margin during its low-speed revolution, the phase margin during the low-speed revolution is excessive if the compensation amount (the phase lead amount) is constant. For this reason, in the embodiment, compensation time for moderating the compensation amount (the phase lead amount) in the low-revolution range is defined as fixed time, and the compensation amount (the phase lead amount) is obtained by the product of the fixed time and the number of revolutions. Here, when a transfer function in the case of the configuration of the general current control is sought, the number of revolutions appears as a constant in a characteristic equation. Accordingly, a frequency characteristic changes with the number of revolutions and the phase margin therefore tends to be reduced as described above.

Figure 5:
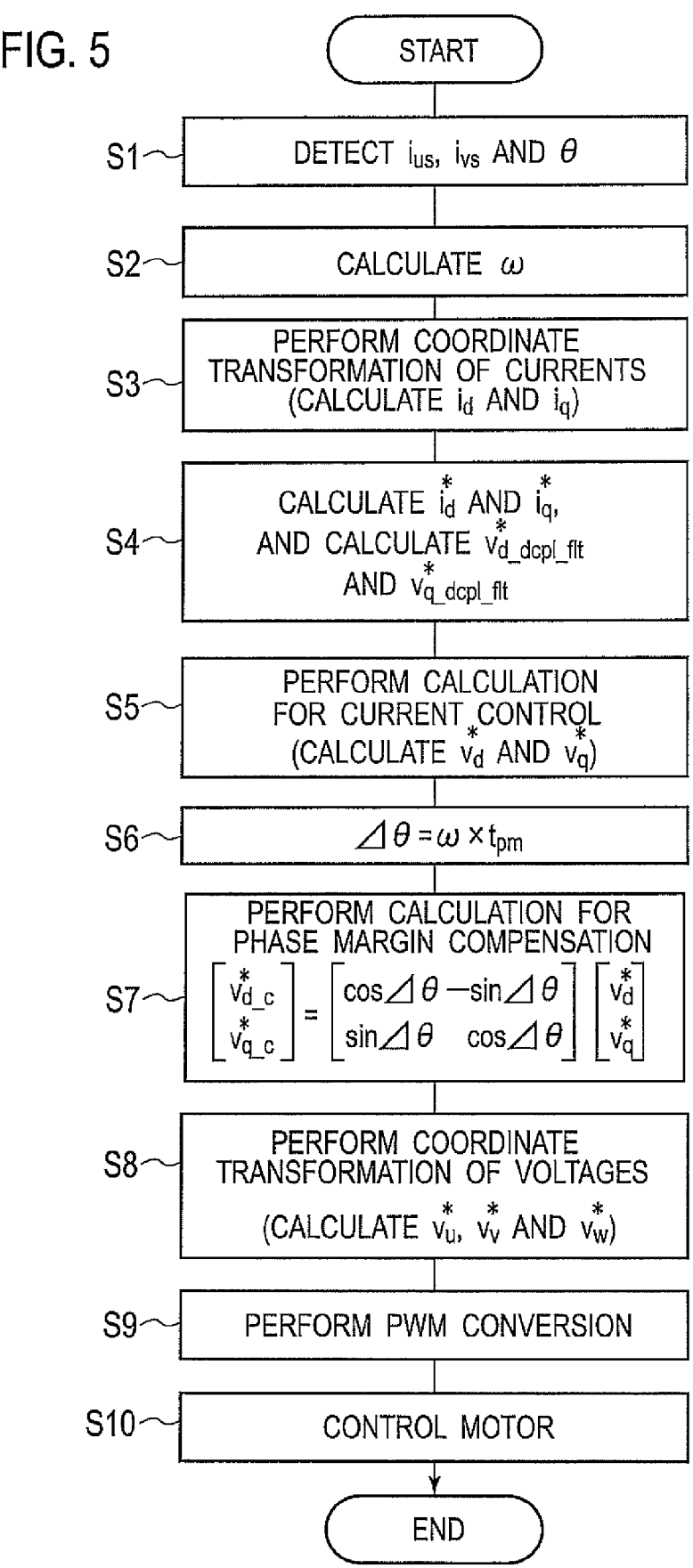
FIG. 5 is a flowchart showing control procedures for the inverter control device of FIG. 1.

Next, control procedures for feedback control by the inverter control device of the embodiment will be described by using FIG. 5.

In step S1, the phase currents ($i_{us}$, $i_{vs}$) are detected by the A/D converter 13 from the phase currents ($i_u$, $i_v$) detected by the current sensor 7. Meanwhile, the pulse counter 14 detects the detection value ($\theta$) by counting the pulses that are outputted from the magnetic pole position detector 9. In step S2, the rotational frequency calculator 11 calculates the angular frequency ($\omega$) of the motor 8. In step S3, the coordinate transformer 10 performs the coordinate transformation of the phase currents ($i_{us}$, $i_{vs}$, $i_{ws}$) into the d- and q-axis currents ($i_d$, $i_q$).

In step S4, the current-voltage mapping unit 1 refers to the above-described map and calculates the d- and q-axis current command values ($i^*_d$, $i^*_q$) as well as the d- and q-axis non-interference voltage command values ($V^*_{d\_dcpl}$, $V^*_{q\_dcpl}$), on the basis of the torque command value ($T^*$) inputted from the outside, the angular frequency ($\omega$), and the voltage ($V_{dc}$). The LPF 12 calculates the post-filtering voltage command values ($V^*_{d\_dcpl\_flt}$, $V^*_{q\_dcpl\_flt}$) from the d- and q-axis non-interference voltage command values ($V^*_{d\_dcpl}$, $V^*_{q\_dcpl}$). In step S5, the current controller 2 calculates the d- and q-axis voltage command values ($V^*_d$, $V^*_q$) from the d- and q-axis current command values ($i^*_d$, $i^*_q$), the post-filtering voltage command values ($V^*_{d\_dcpl\_flt}$, $V^*_{q\_dcpl\_flt}$) and the d- and q-axis currents ($i_d$, $i_q$).

In step S6, the stability compensator 16 calculates the phase lead amount ($\Delta\theta$) by multiplying the phase compensation time ($t_{pm}$) by the angular frequency ($\omega$). In step S7, the stability compensator 16 performs the calculation for compensating for the phase margin by causing the phases of the d- and q-axis voltage command values ($V^*_d$, $V^*_q$) to lead by the phase lead amount ($\Delta\theta$) in accordance with the rotating coordinate transformation. In step S8, the post-correction d- and q-axis voltage command values ($V^*_{d\_c}$, $V^*_{q\_c}$), which are results of the calculation in step S7, are subjected to the coordinate transformation by using the phase amount ($\theta'$) outputted from the dead time compensator 15. Thus, the U-, V- and W-phase voltage command values ($V^*_u$, $V^*_v$, $V^*_w$) are calculated. Then, in step S9, the PWM converter 4 performs the PWM conversion of the U-, V- and W-phase voltage command values ($V^*_u$, $V^*_v$, $V^*_w$) into the drive signals ($D^*_{uu}$, $D^*_{ul}$, $D^*_{vu}$, $D^*_{vl}$, $D^*_{wu}$, $D^*_{wl}$). In step S10, the inverter 6 is subjected to switching control on the basis of the drive signals, and the motor 8 is thereby driven.

As described above, the embodiment is configured: to calculate the phase lead amount ($\Delta\theta$) on the basis of the angular frequency ($\omega$), and the phase compensation time ($t_{pm}$) set for obtaining the predetermined stabilized phase margin; and to compensate for the command values in such a manner as to cause the phases, which are based on the inherent characteristic of the motor 8, to lead in accordance with the phase lead amount ($\Delta\theta$). Accordingly, it is possible to suppress the reduction in phase margin attributed to the inherent characteristic of the motor 8, and thus to realize the inverter control device with the stable control system. In addition, the embodiment is capable of securing the phase margin while reducing a phase delay in the low-frequency region, and suppressing the reduction in gain in the high-frequency region. Thus, the embodiment can eliminate the readjustment of the phase margin or the gain margin.

Moreover, the embodiment is configured to perform the phase compensation in such a manner as to cause the d- and q-axis voltage command values to advance in accordance with the phase lead amount ($\Delta\theta$). Thereby, it is possible to suppress the reduction in phase margin attributed to the inherent characteristic of the motor 8, and thus to realize the inverter control device with the stable control system.

Further, in the embodiment, the stability compensator 16 compensates for a rotating angle of the rotating coordinate transformation on the basis of the phase lead amount ($\Delta\theta$). Thereby, it is possible to stabilize the control system while reducing a computational burden on a controlling microcomputer.

Further, in this embodiment, the phase lead amount ($\Delta\theta$) is calculated by multiplying the phase compensation time ($t_{pm}$) by the angular frequency ($\omega$). Thereby, while setting the phase compensation time ($t_{pm}$) at a fixed value, it is possible to suppress a variation in the phase margin even when the angular frequency changes in accordance with the state of the motor 8. Hence, the inverter control device with the stable control system can be realized.

Further, in this embodiment, the stability compensator 16 stores the table which associates the phase compensation time ($t_{pm}$) with any of the angular frequency ($\omega$), the torque command value ($T^*$), the temperature (temp.) of the motor 8, and the input voltage ($V_{dc}$) to the inverter 6. The phase margin also varies with the angular frequency ($\omega$), and also with any of the inductance of the motor 8 and winding resistance, which are influenced by the current or the magnitude of magnetic flux of the motor 8. Meanwhile, a maximum efficiency current condition in the inverter control device of the embodiment varies with the voltage of the battery 5 even under the same torque. For this reason, in the embodiment, the phase compensation time ($t_{pm}$) is set in accordance with the angular frequency ($\omega$), the torque command value (T*), the temperature (temp.) of the motor 8, or the input voltage ($V_{dc}$) to the inverter 6 each of which represents an operating point. Thus, it is possible to stabilize the control system even when a characteristic of the control system is changed.

In the embodiment, the table stored in the stability compensator 16 does not always have to be the table which associates the phase compensation time ($t_{pm}$) with the angular frequency ($\omega$), the torque command value (T*), the temperature (temp.) of the motor 8, and the input voltage ($V_{dc}$) to the inverter 6. The table only needs to associate the phase compensation time ($t_{pm}$) with a value of at least any one of the angular frequency ($\omega$), the torque command value (T*), the temperature (temp.) of the motor 8, and the input voltage ($V_{dc}$) to the inverter 6. Alternatively, the table stored in the stability compensator 16 may associate the phase compensation time ($t_{pm}$) with a current of the motor 8.

Figure 6:
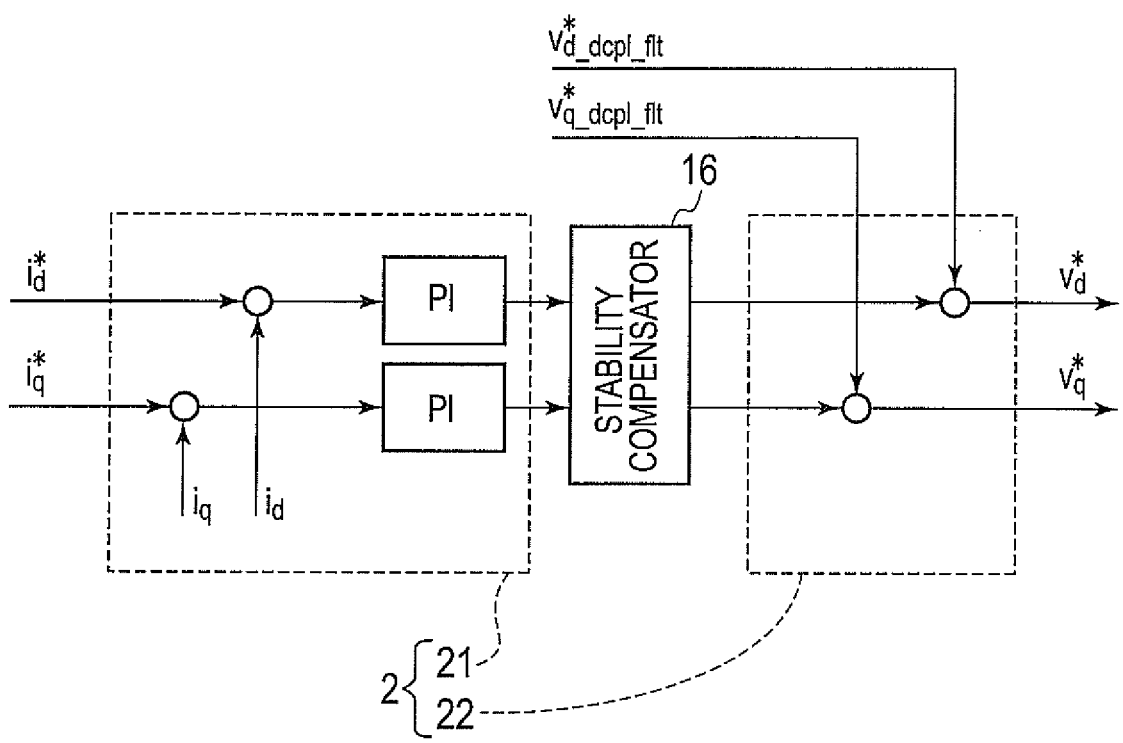
FIG. 6 is a block diagram of a current controller and a stability compensator according to a modified example of the inverter control device of FIG. 1.

Meanwhile, as shown in FIG. 6, the embodiment may be configured to provide the stability compensator 16 between a current control unit 21 and a non-interference control unit 22 which collectively constitute the current controller 2, and to perform the phase compensation in such a manner as to cause the d- and q-axis voltage command values to advance in accordance with the phase lead amount ($\Delta\theta$). FIG. 6 is a block diagram of the current controller 2 and the stability compensator 16 representing a modified example of the inverter control device of the embodiment. The current control unit 21 performs the feedback control in accordance with PI control in such a manner as to cause the d- and q-axis currents ($i_d$, $i_q$) to follow the d- and q-axis current command values ($i^*_d$, $i^*_q$), respectively, and then sends an output to the stability compensator 16. The non-interference control unit 22 performs control calculation by using the command values corrected by the stability compensator 16 and the post-filtering voltage command values ($V^*_{d\_dcpl\_flt}$, $V^*_{q\_dcpl\_flt}$) as input values, and outputs the d- and q-axis voltage command values ($V^*_d$, $V^*_q$) to the coordinate transformer 3.

The current-voltage mapping unit 1, the current controller 2, and the coordinate transformer 3 collectively correspond to a "command value calculation unit" of the present invention. The stability compensator 16 corresponds to a "phase compensation unit" of the invention. The PWM converter 4 corresponds to an "inverter control unit" of the invention. The magnetic pole position detector 9, the pulse counter 14, and the rotational frequency calculator 11 collectively correspond to a "motor rotational velocity detection unit" of the invention. The coordinate transformer 10 corresponds to a "first coordinate transformation unit" of the invention. The current-voltage mapping unit 1 corresponds to a "current command value calculation unit" of the invention. The current controller 2 corresponds to a "voltage command value calculation unit" of the invention. The coordinate transformer 3 corresponds to a "second coordinate transformation unit" of the invention.

Second Embodiment

An inverter control device according to another embodiment of the present invention will be described with reference to FIG. 7. This embodiment is different from the above-described first embodiment in that a compensator 18 is provided instead of the stability compensator 16. The other configurations are the same as those in the above-described first embodiment, and the descriptions of the first embodiment will be incorporated herein as appropriate.

Figure 7:
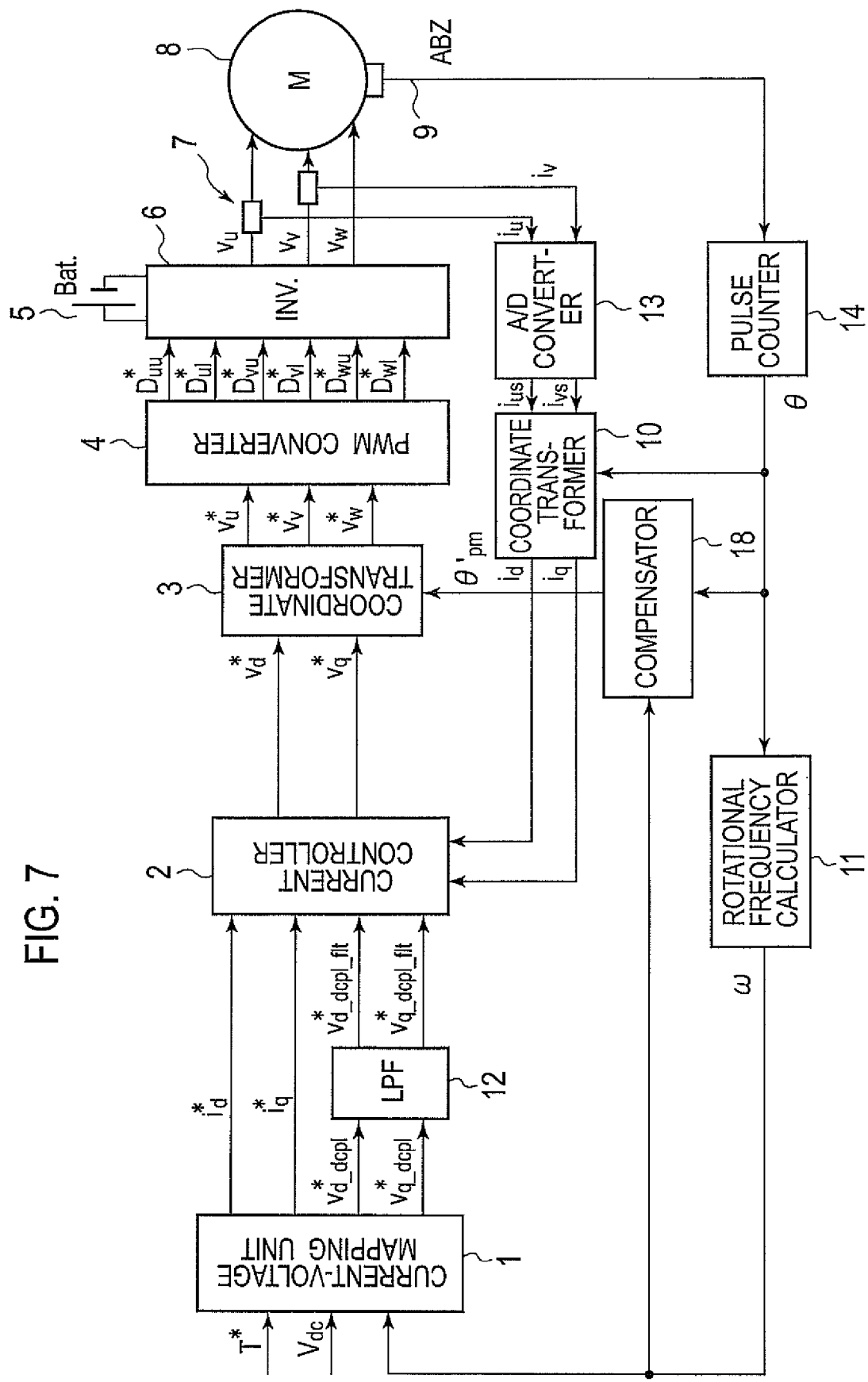
FIG. 7 is a block diagram of an inverter control device according to another embodiment of the present invention.
Figure 8:
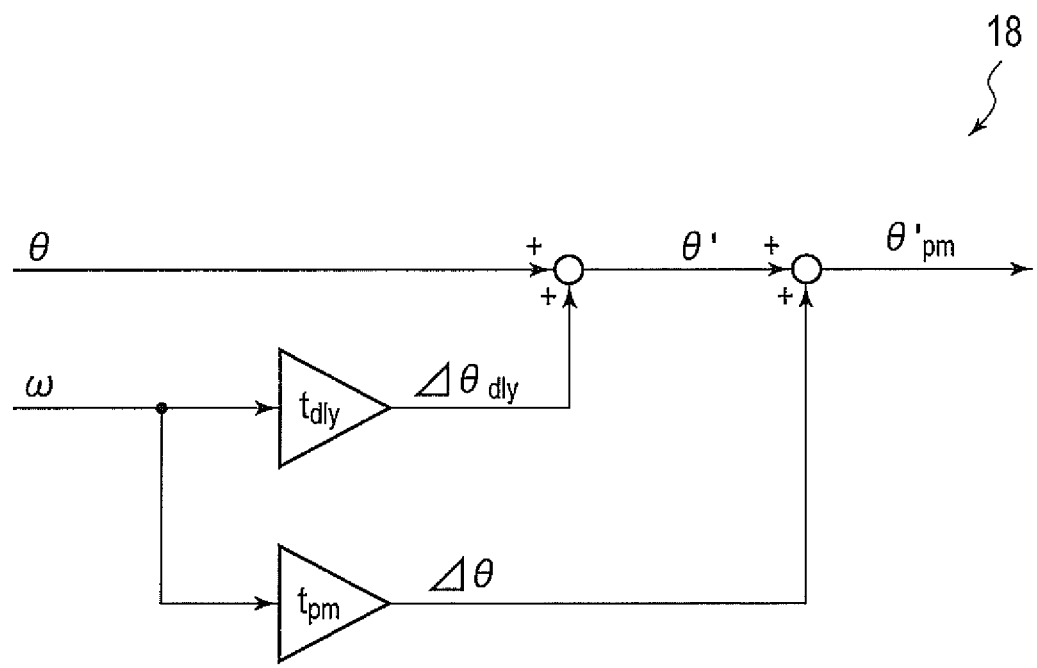
FIG. 8 is a block diagram of a compensator of FIG. 7.

As shown in FIG. 7, the inverter control device of this embodiment includes the compensator 18. The compensator 18 has the functions of the dead time compensator 15 and the stability compensator 16 of the first embodiment. A specific configuration of the compensator 18 will be described by using FIG. 8.

When the detection value ($\theta$) being the output from the pulse counter 14 and the angular frequency ($\omega$) are inputted to the compensator 18, the compensator 18 calculates the phase amount ($\theta'$) by adding the detection value ($\theta$) to a phase change amount ($\Delta\theta_{dly}$) that is obtained by multiplying the angular frequency ($\omega$) by a dead time compensation coefficient ($t_{dly}$). The compensator 18 calculates a phase amount ($\omega'_{pm}$) by adding the phase amount ($\theta'$) to the phase lead amount ($\Delta\theta$) that is obtained by multiplying the angular frequency ($\omega$) by the phase compensation time ($t_{pm}$). Then, the compensator 18 outputs the phase amount ($\omega_{pm}$) to the coordinate transformer 3. Here, the dead time compensation coefficient ($t_{dly}$) corresponds to dead time in a current loop in the inverter control device, which is a coefficient for compensating for the delay in voltage output until the point of the application of the voltage to the motor 8, the delay attributed to the dead time caused by the zero-order hold sampling in the current sensor 7 and the A/D converter 13, and the delay caused by the noise-cut filter.

Figure 9:
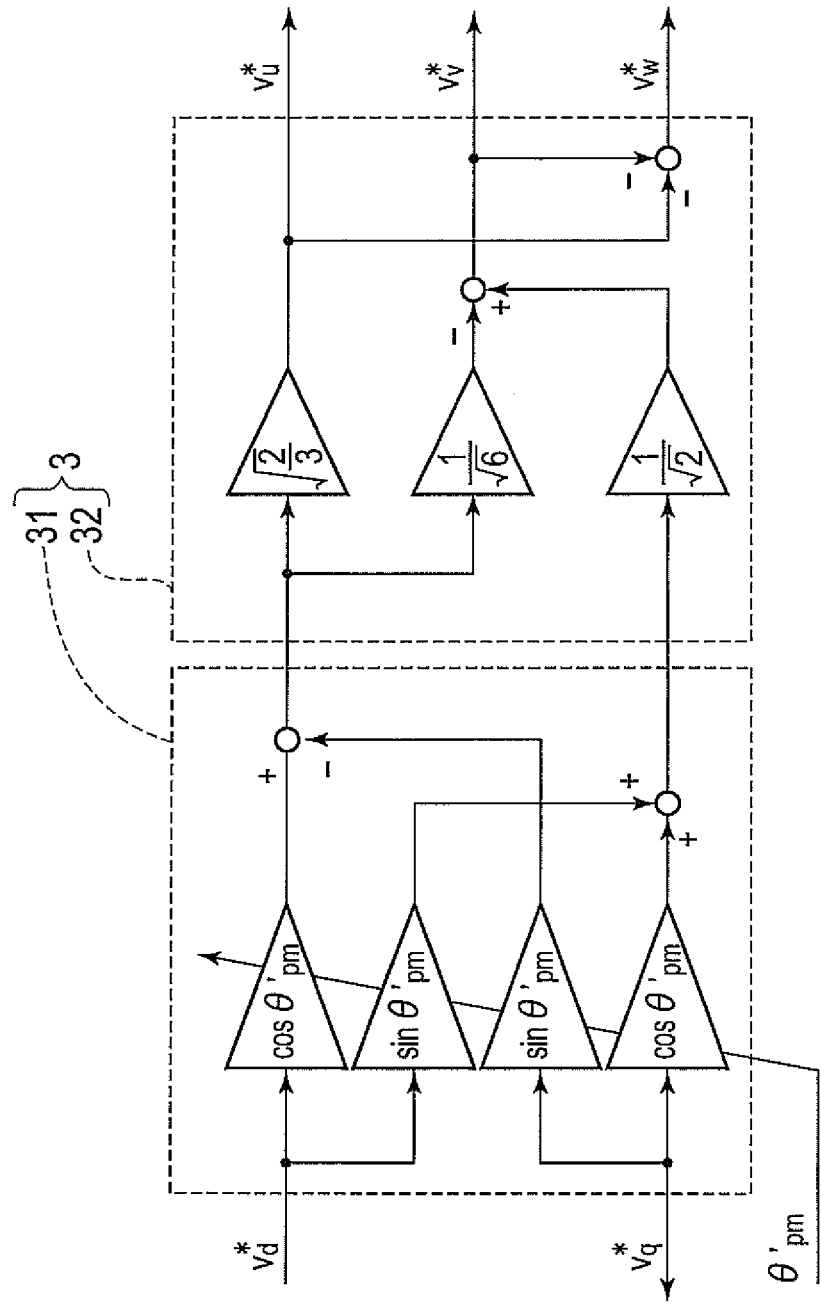
FIG. 9 is block diagram of a coordinate transformer of FIG. 7.

Next, a specific configuration of the coordinate transformer 3 will be described by using FIG. 9. The coordinate transformer 3 is a transformer configured to transform the d- and q-axis voltage command values ($V^*_d$, $V^*_q$) outputted from the current controller 2 from a rectangular rotating coordinate system (a d- and q-axis coordinate system) into the three-phase fixed coordinate system (the U-, V- and W-phases). The coordinate transformer 3 includes a rotational transformation unit 31 and a phase transformation unit 32.

The rotational transformation unit 31 transforms the rotating coordinate system into the rectangular coordinate system while rotating the rotating coordinate system by the phase amount ($\omega'_{pm}$). The phase transformation unit 32 transforms the rectangular coordinate system into the three-phase coordinate system. The rotational transformation unit 31 calculates a d-axis voltage command value in the rectangular coordinate system by subtracting a product of the q-axis voltage command value ($V^*_q$) and sin $\theta'_{pm}$ from a product of the d-axis voltage command value ($V^*_d$) and cos $\theta'_{pm}$. The rotational transformation unit 31 calculates a q-axis voltage command value in the rectangular coordinate system by adding a product of the d-axis voltage command value ($V^*_d$) and sin $\theta'_{pm}$ to a product of the q-axis voltage command value ($V^*_q$) and cos $\theta'_{pm}$. Meanwhile, the phase transformation unit 32 calculates a U-phase voltage command value ($V^*_u$), by multiplying the d-axis voltage command value by a coefficient ($(2/3)^{1/2}$), then calculates a V-phase voltage command value ($V^*_v$) by subtracting a product of the d-axis voltage command value and a coefficient ($1/(6^{1/2})$) from a product of the q-axis voltage command value and a coefficient ($1/(2^{1/2})$), and calculates a W-phase voltage command value ($V^*_w$) by subtracting a product of the d-axis voltage command value and the coefficient ($(2/3)^{1/2}$) from a product of the V-phase voltage command value ($V^*_v$) and a coefficient ($-1$). Then, the U-, V- and W-phase voltage command values ($V^*_u$, $V^*_v$, $V^*_w$) representing the results of the calculation by the phase transformation unit 32 are outputted to the PWM converter 4.

Figure 10:
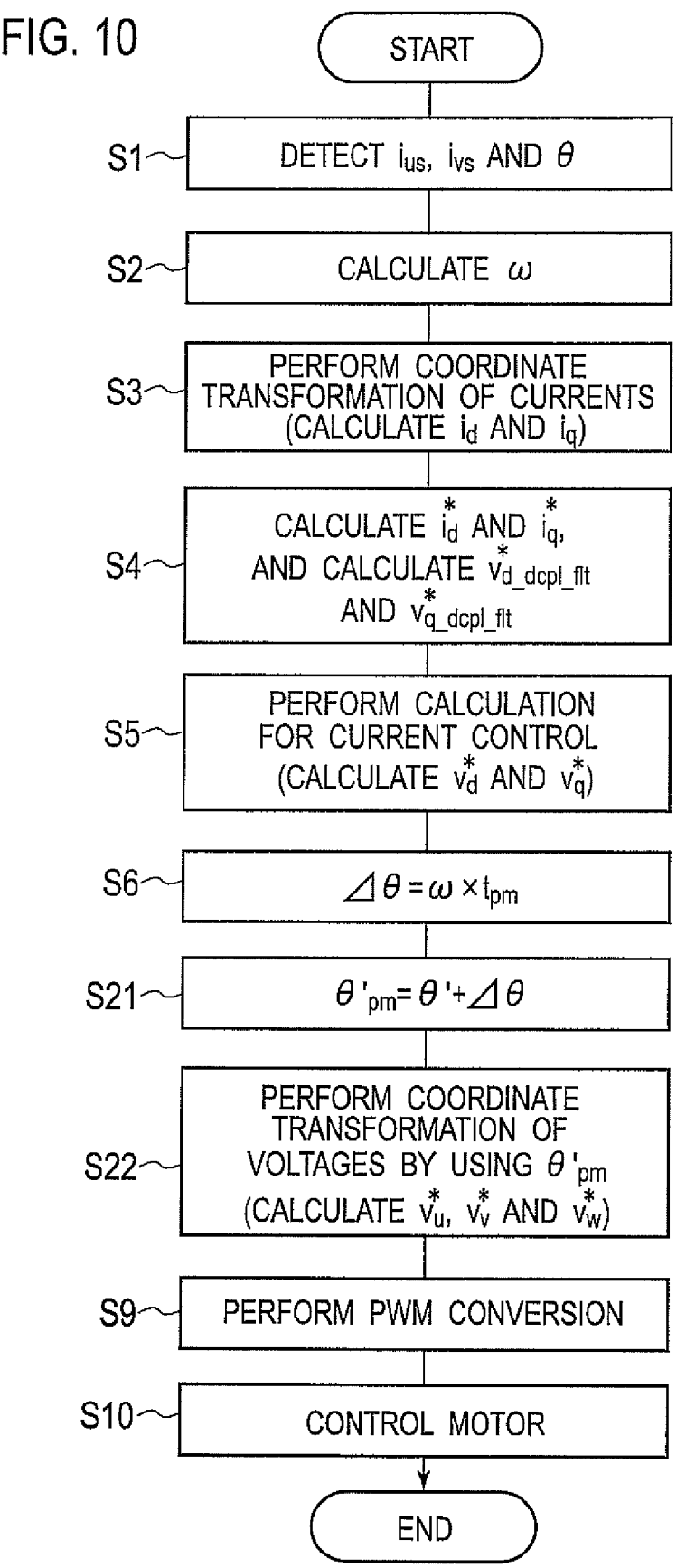
FIG. 10 is a flowchart showing control procedures for the inverter control device of FIG. 7.

Next, control procedures for the feedback control by the inverter control device of the embodiment will be described by using FIG. 10. Here, the contents of the control in steps S1 to S6, S9, and S10 are the same as the contents of the control in steps S1 to S6, S9, and S10 by the inverter control device according to the first embodiment shown in FIG. 5, and their descriptions will therefore be omitted.

In step S21, the compensator 18 calculates the phase amount ($\omega'_{pm}$) by adding the phase amount ($\theta'$) to the phase lead amount ($\Delta\theta$) calculated in step S6. In step S22, the coordinate transformer 3 performs the coordinate transformation of the d- and q-axis voltage command values ($V^*_d$, $V^*_q$) by using the phase amount ($\omega'_{pm}$), and calculates the U-, V- and W-phase voltage command values ($V^*_u$, $V^*_v$, $V^*_w$).

As described above, this embodiment is configured: to calculate the phase lead amount ($\Delta\theta$) on the basis of the angular frequency ($\omega$), and the phase compensation time ($t_{pm}$) set for obtaining the predetermined stabilized phase margin; to calculate the phase amount ($\omega'_{pm}$) from the phase lead amount ($\Delta\theta$); and to compensate for the command values in such a manner as to cause the phases, which are based on the inherent characteristic of the motor 8, to lead accordingly. Thereby, it is possible to suppress the reduction in phase margin attributed to the inherent characteristic of the motor 8 by compensating for the command values in such a manner as to cause the phases based on the inherent characteristic of the motor 8 to lead in accordance with the phase lead amount ($\Delta\theta$), and thus to realize the inverter control device with the stable control system. In addition, the embodiment is capable of securing the phase margin while reducing the phase delay in the low-frequency region, and suppressing the reduction in gain in the high-frequency region. Thus, the embodiment can eliminate the readjustment of the phase margin or the gain margin.

Moreover, the embodiment is configured to perform the phase compensation in such a manner as to cause the d- and q-axis voltage command values to lead in accordance with the phase lead amount ($\Delta\theta$) by: calculating the phase amount ($\omega'_{pm}$) from the phase lead amount ($\Delta\theta$); and then compensating for the d- and q-axis voltage command values by using the phase amount ($\theta'_{pm}$). Thereby, it is possible to suppress the reduction in phase margin attributed to the inherent characteristic of the motor 8, and thus to realize the inverter control device with the stable control system.

Further, in the embodiment, the rotating angle ($\omega'_{pm}$) of the rotating coordinate transformation by the coordinate transformer 3 is compensated for on the basis of the phase lead amount ($\Delta\theta$). Thus, it is possible to stabilize the control system while reducing the computational burden on the controlling microcomputer.

The compensator 18 corresponds to the "phase compensation unit" of the present invention.

Third Embodiment

Figure 11:
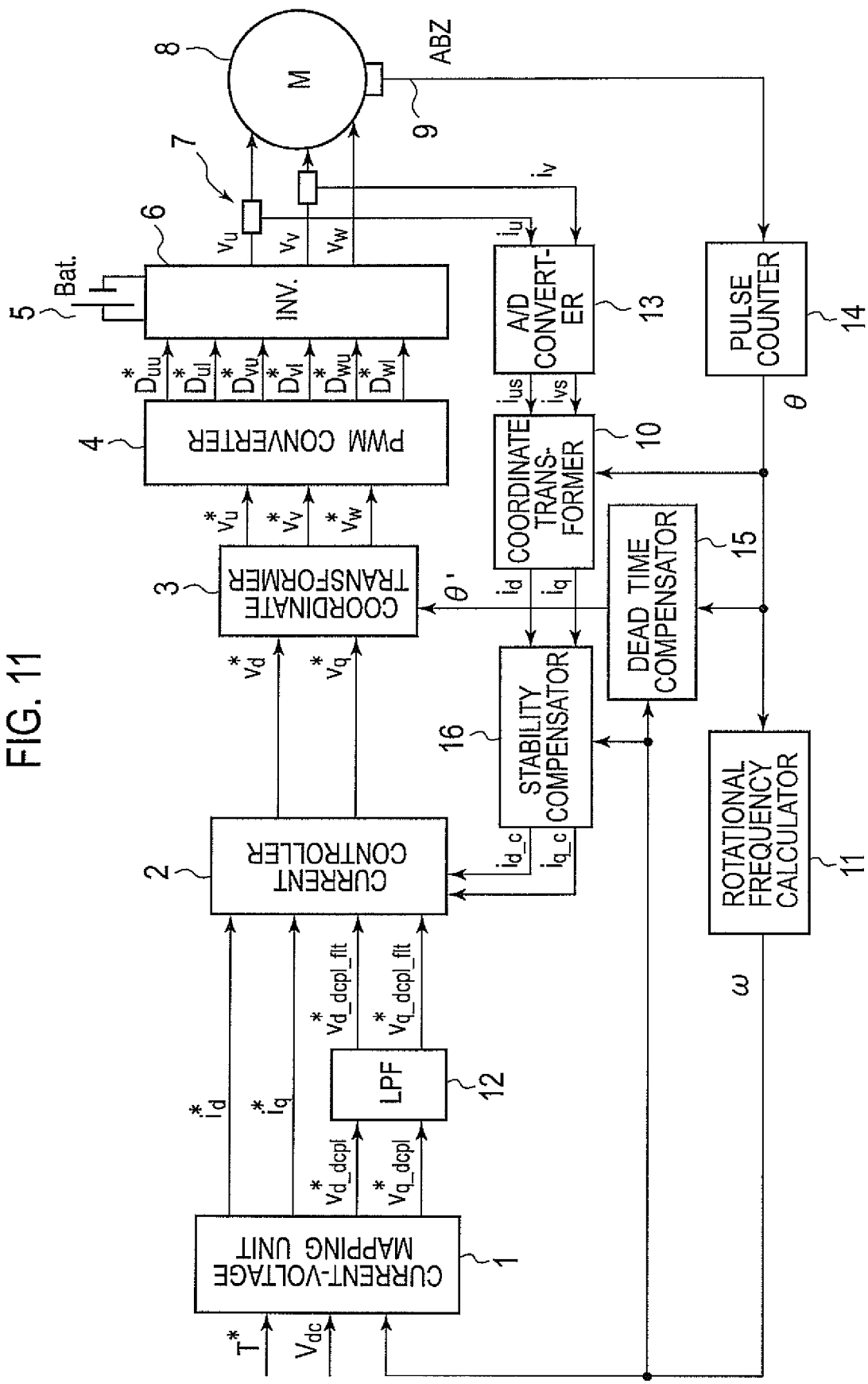
FIG. 11 is a block diagram of an inverter control device according to yet another embodiment of the present invention.

An inverter control device according to yet another embodiment of the present invention will be described with reference to FIG. 11. This embodiment is different from the above-described first embodiment in that the stability compensator 16 is provided between the current controller 2 and the coordinate transformer 10. The other configurations are the same as those in the above-described first embodiment, and the descriptions of the first embodiment and the second embodiment will be incorporated herein as appropriate.

The stability compensator 16 is the compensator which is provided between the coordinate transformer 10 and the current controller 2 and is configured to compensate for the phases of the d- and q-axis currents ($i_d$, $i_q$) in accordance with the phase lead amount ($\Delta\theta$). To be more precise, the stability compensator 16 corrects the d- and q-axis currents ($i_d$, $i_q$) on the basis of the angular frequency ($\omega$), and outputs post-correction d- and q-axis currents ($i_{d\_c}$, $i_{q\_c}$) to the current controller 2. The current controller 2 performs control calculation by using the d- and q-axis current command values ($i^*_d$, $i^*_q$), the post-filtering voltage command values ($V^*_{d\_dcpl\_flt}$, $V^*_{q\_dcpl\_flt}$), and the post-correction d- and q-axis currents ($i_{d\_c}$, $i_{q\_c}$) as input values, and outputs the d- and q-axis voltage command values ($V^*_d$, $V^*_q$) to the coordinate transformer 3. Since the current controller 2 performs the control calculation by using the post-correction d- and q-axis currents ($i_{d\_c}$, $i_{q\_c}$) as the input values, the d- and q-axis voltage command values ($V^*_d$, $V^*_q$) outputted from the current controller 2 become the command values which are compensated for on the basis of the phase lead amount ($\Delta\theta$) to be described later.

Figure 12:
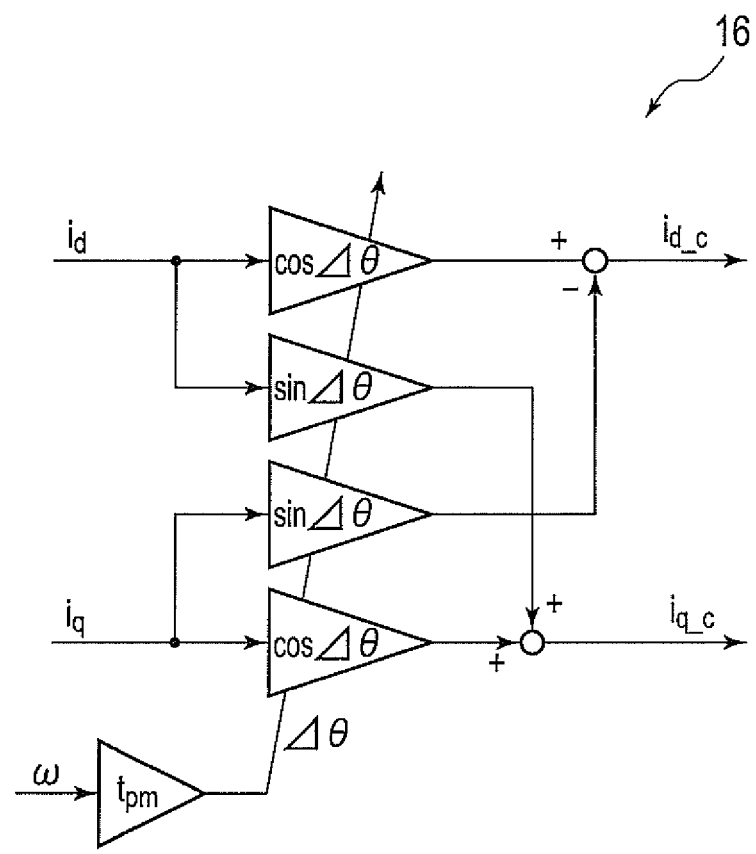
FIG. 12 is a block diagram of a stability compensator of FIG. 11.

Next, a detailed configuration of the stability compensator 16 will be described by using FIG. 12. The stability compensator 16 calculates the post-correction d- and q-axis currents ($i_{d\_c}$, $i_{q\_c}$) from the d- and q-axis currents ($i_d$, $i_q$) by using the rotating coordinate transformation in the rectangular coordinates. Specifically, the post-correction d-axis current ($i^*_{d\_c}$) is calculated by subtracting a product of the q-axis current ($i_q$) and $\sin(\Delta\theta)$ from a product of the d-axis current ($i_d$) and $\cos(\Delta\theta)$. Meanwhile, the post-correction q-axis current ($i_{q\_c}$) is calculated by adding a product of the d-axis current ($i_d$) and $\sin(\Delta\theta)$ to a product of the q-axis current ($i_q$) and $\cos(\Delta\theta)$. The rotating phase lead amount ($\Delta\theta$) to be rotated by the rotating coordinate transformation by the stability compensator 16 is calculated by the product of the phase compensation time ($t_{pm}$) and the angular frequency ($\omega$). The phase compensation time ($t_{pm}$) is a value determined on the basis of the inherent characteristic of the motor 8, which is a preset value as well as a fixed value.

Thus, current detection values are corrected with the phase lead amount ($\Delta\theta$) in such a manner as to cause the phases to lead in the rotational direction of the motor 8 without changing a magnitude of a voltage detection value vector composed of the d-axis current ($i_d$), which is a current detection value in the direction of the magnetic pole, and the q-axis current ($i_q$), which is a current detection value in the orthogonal direction to the magnetic pole.

Figure 13:
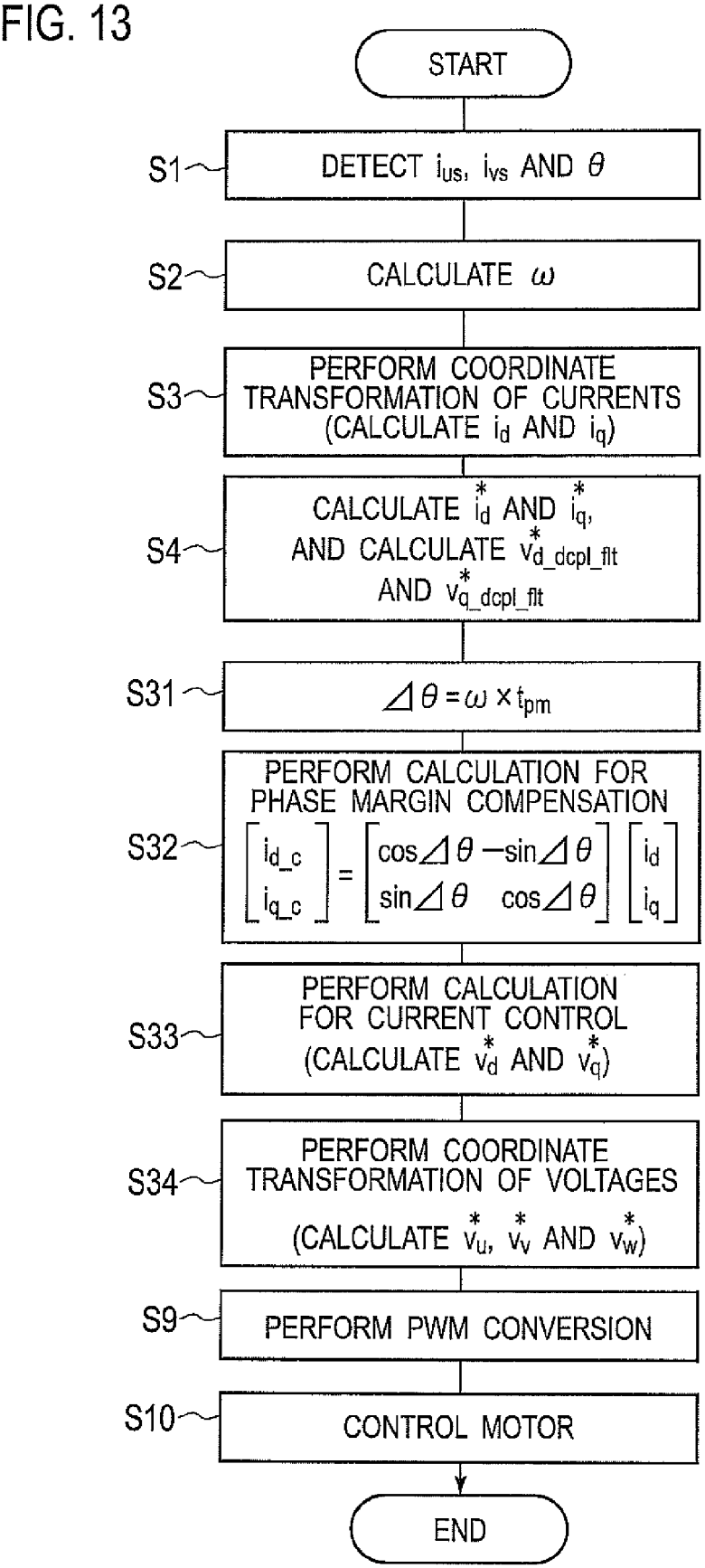
FIG. 13 is a flowchart showing control procedures for the inverter control device of FIG. 11.

Next, control procedures for the feedback control by the inverter control device of the embodiment will be described by using FIG. 13. Here, the contents of the control in steps S1 to S4, S9, and S10 are the same as the contents of the control in steps S1 to S4, S9, and S10 by the inverter control device according to the first embodiment shown in FIG. 5, and their descriptions will therefore be omitted.

In step S31, the stability compensator 16 calculates the phase lead amount ($\Delta\theta$) by multiplying the phase compensation time ($t_{pm}$) by the angular frequency ($\omega$). In step S32, the stability compensator 16 performs the calculation for compensating for the phase margin by causing the phases of the d- and q-axis currents ($i_d$, $i_q$) to lead in the phase lead amount ($\Delta\theta$) in accordance with the rotating coordinate transformation. Then, the stability compensator 16 outputs the post-correction d- and q-axis currents ($i_{d\_c}$, $i_{q\_c}$), which are results of the calculation, to the current controller 2. In step S33, the current controller 2 calculates the d- and q-axis voltage command values ($V^*_d$, $V^*_q$) from the d- and q-axis current command values ($i^*_d$, $i^*_q$), the post-filtering voltage command values ($V^*_{d\_dcpl\_flt}$, $V^*_{q\_dcpl\_flt}$), and the post-correction d- and q-axis currents ($i_{d\_c}$, $i_{q\_c}$). In step S34, the coordinate transformer 3 performs the coordinate transformation of the d- and q-axis voltage command values ($V^*_d$, $V^*_q$) by using the phase amount ($\theta'$) outputted from the dead time compensator 15, thereby calculating the U-, V- and W-phase voltage command values ($V^*_u, V^*_v, V^*_w$).

As described above, the embodiment is configured: to calculate the phase lead amount ($\Delta\theta$) on the basis of the angular frequency ($\omega$) and the phase compensation time ($t_{pm}$) set for obtaining the predetermined stabilized phase margin; and to compensate for the detection values in such a manner as to cause the phases, which are based on the inherent characteristic of the motor 8, to lead in accordance with the phase lead amount ($\Delta\theta$). Accordingly, it is possible to suppress the reduction in phase margin attributed to the inherent characteristic of the motor 8, and thus to realize the inverter control device with the stable control system. In addition, the embodiment is capable of securing the phase margin while reducing the phase delay in the low-frequency region, and suppressing the reduction in gain in the high-frequency region. Thus, the embodiment can eliminate readjustment of the phase margin or the gain margin.

Moreover, the embodiment is configured to perform the phase compensation in such a manner as to cause the d- and q-axis currents to lead in accordance with the phase lead amount ($\Delta\theta$). Thereby, it is possible to suppress the reduction in phase margin attributed to the inherent characteristic of the motor 8, and thus to realize the inverter control device with the stable control system.

The current sensor 7 corresponds to the "current detection unit" and the coordinate transformer 10 corresponds to the "first coordinate transformation unit".

Fourth Embodiment

Figure 14:
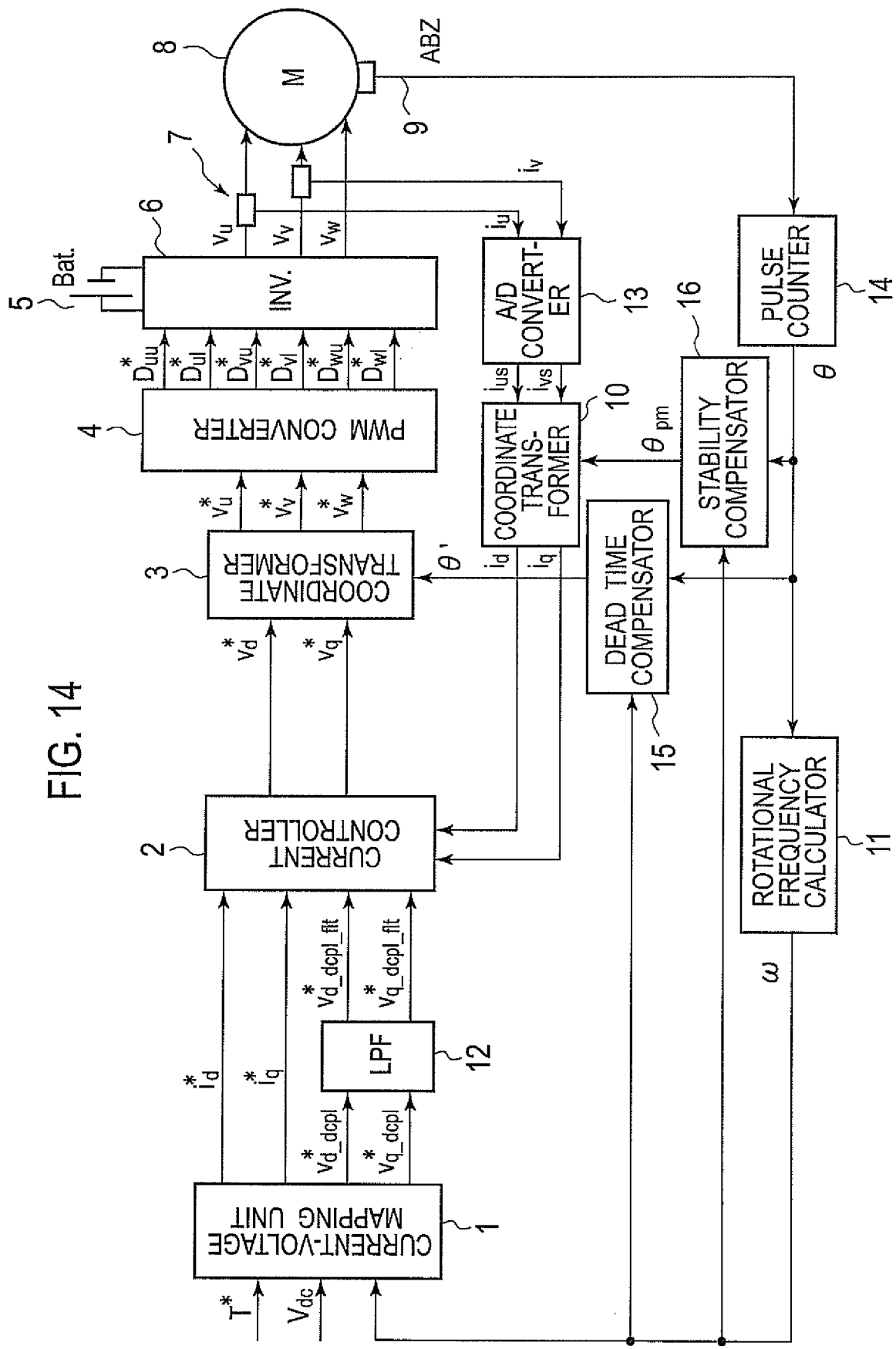
FIG. 14 is a block diagram of an inverter control device according to still another embodiment of the present invention.

An inverter control device according to still another embodiment of the present invention will be described with reference to FIG. 14. This embodiment is different from the above-described first embodiment in that the stability compensator 16 is provided between the coordinate transformer 10 and the pulse counter 14. The other configurations are the same as those in the above-described first embodiment, and the descriptions of the first to third embodiments will be incorporated herein as appropriate.

Figure 15:
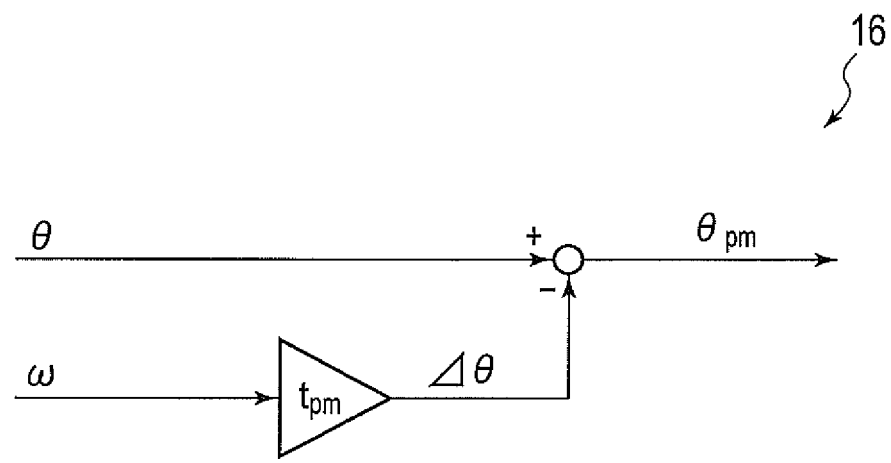
FIG. 15 is a block diagram of a stability compensator of FIG. 14.

The stability compensator 16 is provided between the pulse counter 14 and the coordinate transformer 10, and is configured to calculate the rotating angle of the rotating coordinate transformation by the coordinate transformer 10. A specific configuration of the stability compensator 16 will be described by using FIG. 15.

When the detection value ($\theta$), which is an output from the pulse counter 14, and the angular frequency ($\omega$) are inputted to the stability compensator 16, the stability compensator 16 calculates a phase amount ($\theta_{pm}$) by subtracting the phase lead amount ($\Delta\theta$), which is the product of the angular frequency ($\omega$) and the phase compensation time ($t_{pm}$), from the detection value ($\theta$).

Next, a specific configuration of the coordinate transformer 10 will be described by using FIG. 16. The coordinate transformer 10 is a transformer configured to transform the phase currents ($i_{us}, i_{vs}, i_{ws}$), which are outputted from the A/D converter 13, from the three-phase fixed coordinate system (the U-, V- and W-phases) into the rectangular rotating coordinate system (the d- and q-axis coordinate system). The coordinate transformer 10 includes a phase transformation unit 101 and a rotational transformation unit 102.

The phase transformation unit 101 calculates and outputs a d-axis current by: subtracting a product of the phase current ($i_{vs}$) and a coefficient (1/2) as well as a product of the phase current ($i_{ws}$) and the coefficient (1/2) from the phase current ($i_{us}$); and then multiplying the resultant value by a coefficient ($(2/3)^{1/2}$). Meanwhile, the phase transformation unit 101 calculates and outputs a q-axis current by: subtracting the phase current ($i_{ws}$) from the phase current ($i_{vs}$); and then multiplying the resultant value by a coefficient ($1/(2^{1/2})$). The rotational transformation unit 102 calculates the d-axis current ($i_d$) of the rotating coordinate system by adding a product of the q-axis current and $\sin\theta_{pm}$ to a product of the d-axis current and $\cos\theta_{pm}$. Meanwhile, the rotational transformation unit 102 calculates the q-axis current ($i_q$) of the rotating coordinate system by subtracting a product of the d-axis current and $\sin\theta_{pm}$ from a product of the q-axis current and $\cos\theta_{pm}$. Then, the d- and q-axis currents ($i_d, i_q$) which are results of the calculation by the rotational transformation unit 102 are outputted to the current controller 2.

Figure 16:
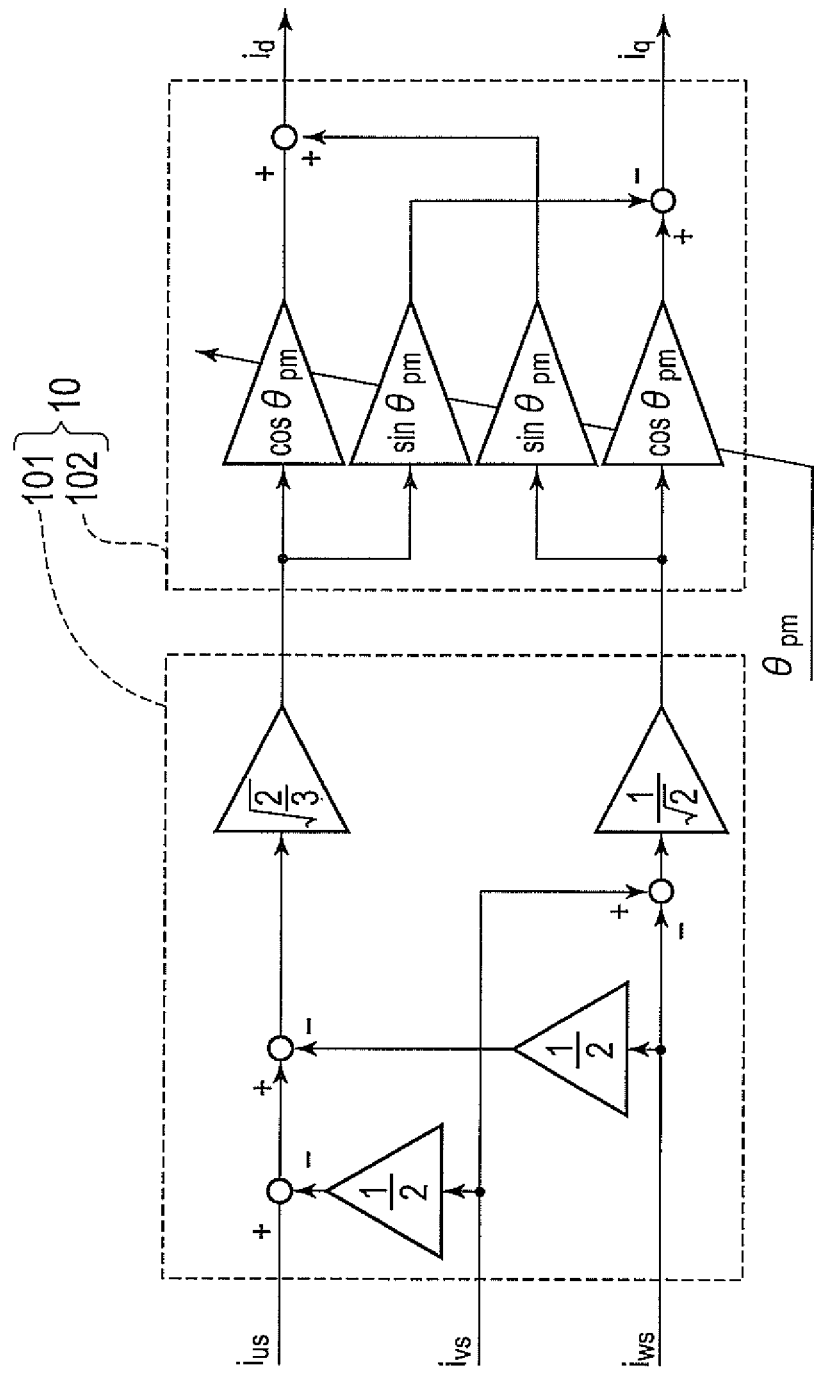
FIG. 16 is block diagram of a coordinate transformer of FIG. 14.

Here, as shown in FIG. 16, the d axis and the q axis cross each other in the rotational transformation unit 102, and signs used for the correction of d-axis components and q-axis components are inverted as compared to those used by the rotational transformation unit 31 (see FIG. 9) according to the second embodiment. For this reason, the stability compensator 16 of the embodiment performs the correction by subtracting the phase lead amount ($\Delta\theta$) from the detection value ($\theta$).

Figure 17:
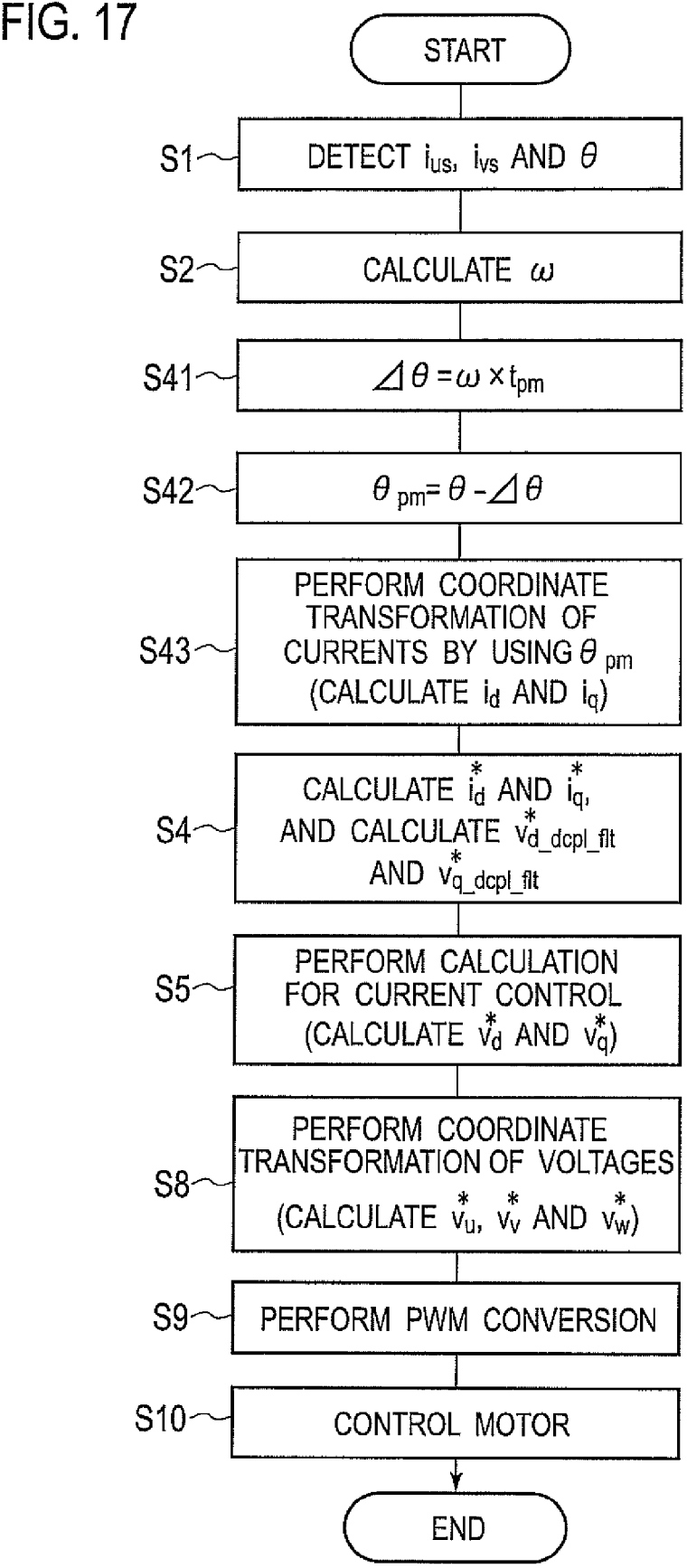
FIG. 17 is a flowchart showing control procedures for the inverter control device of FIG. 14.

Next, control procedures for the feedback control by the inverter control device of the embodiment will be described by using FIG. 17. Here, the contents of the control in steps S1, S2, S4, S5, and S8 to S10 are the same as the contents of the control in steps S1, S2, S4, S5, and S8 to S10 by the inverter control device according to the first embodiment shown in FIG. 5, and their descriptions will therefore be omitted.

In step S41, the stability compensator 16 calculates the phase lead amount ($\Delta\theta$) by multiplying the phase compensation time ($t_{pm}$) by the angular frequency ($\omega$). In step S42, the stability compensator 16 calculates the phase amount ($\theta_{pm}$) by subtracting the phase lead amount ($\Delta\theta$) from the detection value ($\theta$). In step S43, the coordinate transformer 10 performs the coordinate transformation of the phase currents ($i_{us}, i_{vs}, i_{ws}$) by using the phase amount ($\theta_{pm}$), thereby calculating the d- and q-axis currents ($i_d, i_q$).

As described above, the embodiment is configured: to calculate the phase lead amount ($\Delta\theta$) on the basis of the angular frequency ($\omega$) and the phase compensation time ($t_{pm}$) set for obtaining the predetermined stabilized phase margin; and to compensate for the phases based on the inherent characteristic of the motor 8 and to compensate for the detection values in accordance with the phase lead amount ($\Delta\theta$). Accordingly, it is possible to suppress the reduction in phase margin attributed to the inherent characteristic of the motor 8, and thus to realize the inverter control device with the stable control system. In addition, the embodiment is capable of securing the phase margin while reducing the phase delay in the low-frequency region, and suppressing the reduction in gain in the high-frequency region. Thus, the embodiment can eliminate readjustment of the phase margin or the gain margin.

Moreover, the embodiment is configured to compensate for the rotating angle ($\theta_{pm}$) of the rotating coordinate transformation by the coordinate transformer 10 on the basis of the phase lead amount ($\Delta\theta$). Thus, it is possible to stabilize the control system while reducing the computational burden on the controlling microcomputer.

Although the contents of the present invention have been described with reference to the embodiments, it is obvious to those skilled in the art that the invention is not limited only to these descriptions and various modifications and improvements are possible.

INDUSTRIAL APPLICABILITY

According to the present invention, a reduction in phase margin is suppressed and a reduction in gain margin is also suppressed with respect to a change in the rotational velocity of a motor. As a consequence, it is possible to stabilize a control system. Thus, the present invention is industrially applicable.

The invention claimed is:

1. An inverter control device comprising:
an inverter configured to convert direct-current power inputted from a direct-current power supply into alternating-current power, and to supply the alternating-current power to a motor;
a command value calculation unit configured to calculate a command value of an alternating-current voltage outputted from the inverter, on the basis of a detection value of an alternating current;
a phase compensation unit configured to compensate for any of a phase of the command value and a phase of the detection value;
an inverter control unit configured to control the inverter on the basis of any of the command value and the detection value compensated for by the phase compensation unit;
a motor rotational velocity detection unit configured to detect a rotational velocity of the motor;
a current detection unit configured to detect the detection value by detecting phase currents of the motor; and
a first coordinate transformation unit configured to transform the phase currents into d- and q-axis currents, wherein
the phase compensation unit calculates a phase lead amount by multiplying the rotational velocity by a phase compensation time determined on a basis of an inherent characteristic of the motor, and compensates for a phase based on an inherent characteristic of the motor in accordance with the phase lead amount,
the command value calculation unit includes
a current command value calculation unit configured to calculate d- and q-axis current command values on the basis of a torque command value and the rotational velocity of the motor, and
a voltage command value calculation unit configured to calculate d- and q-axis voltage command values to conform the d- and q-axis currents to the d- and q-axis current command values, and
the phase compensation unit compensates for phases of the d- and q-axis voltage command values.

2. The inverter control device according to claim 1, wherein
the command value calculation unit further comprises a second coordinate transformation unit configured to perform coordinate transformation of the d- and q-axis voltage command values into voltage command values to be inputted to the inverter control unit, and
the phase compensation unit compensates for a rotating angle of the coordinate transformation by the second coordinate transformation unit on the basis of the phase lead amount.

3. The inverter control device according to claim 1, wherein the phase compensation time is defined as a fixed time.

4. The inverter control device according to claim 1, wherein the phase compensation unit stores a map which associates the phase compensation time with a value of at least one of a current of the motor, a torque command value inputted from outside, a temperature of the motor, and an input voltage to the inverter.

5. An inverter control device comprising:
an inverter configured to convert direct-current power inputted from a direct-current power supply into alternating-current power, and to supply the alternating-current power to a motor;
a command value calculation unit configured to calculate a command value of an alternating-current voltage outputted from the inverter, on the basis of a detection value of an alternating current;
a phase compensation unit configured to compensate for any of a phase of the command value and a phase of the detection value;
an inverter control unit configured to control the inverter on the basis of any of the command value and the detection value compensated for by the phase compensation unit;
a motor rotational velocity detection unit configured to detect a rotational velocity of the motor;
a current detection unit configured to detect the detection value by detecting phase currents of the motor; and
a first coordinate transformation unit configured to perform coordinate transformation of the phase currents into d- and q-axis currents, wherein the phase compensation unit compensates for phases of the d- and q-axis currents, wherein
the phase compensation unit calculates a phase lead amount by multiplying the rotational velocity by a phase compensation time determined on a basis of an inherent characteristic of the motor, and compensates for a phase based on an inherent characteristic of the motor in accordance with the phase lead amount, and
the phase compensation unit compensates for a rotating angle of the coordinate transformation by the first coordinate transformation unit on the basis of the phase lead amount.

6. A method of controlling an inverter comprising:
an operation of converting direct-current power inputted from a direct-current power supply into alternating-current power and supplying the alternating-current power to a motor;
a detection operation of detecting an alternating current outputted from the inverter;
a calculation operation of calculating a command value of an alternating-current voltage outputted from the inverter, on the basis of a detection value detected in the detection operation;
a compensation operation of compensating for a phase of any of the command value and the detection value;
an operation of controlling the inverter on the basis of any of the command value and the detection value compensated for in the compensation operation;
an operation of detecting a rotational velocity of the motor
an operation of detecting the detection value by detecting phase currents of the motor; and
an operation of transforming the phase currents into d- and q-axis currents, wherein in the compensation operation, a phase lead amount is calculated by multiplying the rotational velocity by a phase compensation time determined on a basis of an inherent characteristic of the motor, and a phase based on an inherent characteristic of the motor is compensated for in accordance with the phase lead amount,
the calculation operation includes
an operation of calculating d- and q-axis current command values on the basis of a torque command value and the rotational velocity of the motor, and an operation of calculating d- and q-axis voltage command values to conform the d- and q-axis currents to the d- and q-axis current command values, in the compensation operation, the phases of the d- and q-axis voltage command values are compensated for.

7. A method of controlling an inverter comprising:

an operation of converting direct-current power inputted from a direct-current power supply into alternating-current power and supplying the alternating-current power to a motor;

a detection operation of detecting an alternating current outputted from the inverter;

a calculation operation of calculating a command value of an alternating-current voltage outputted from the inverter, on the basis of a detection value detected in the detection operation;

a compensation operation of compensating for a phase of any of the command value and the detection value;

an operation of controlling the inverter on the basis of any of the command value and the detection value compensated for in the compensation operation; and an operation of detecting a rotational velocity of the motor, an operation of detecting the detection value by detecting phase currents of the motor; and a transformation operation of transforming the phase currents into d- and q-axis currents, wherein the compensation operation includes:

an operation of calculating a phase lead amount by multiplying the rotational velocity by phase compensation time determined on the basis of an inherent characteristic of the motor;

an operation of compensating for phases of the d- and q-axis currents in accordance with the phase lead amount, and an operation of compensating for a rotating angle of the coordinate transformation in the transformation operation on the basis of the phase lead amount.

* * * * *